(12) United States Patent
Oizumi et al.

(10) Patent No.: US 9,276,717 B2
(45) Date of Patent: Mar. 1, 2016

(54) TERMINAL DEVICE, BASE STATION DEVICE, TRANSMISSION METHOD AND RECEPTION METHOD

(71) Applicant: Panasonic Intellectual Property Corporation of America, Torrance, CA (US)

(72) Inventors: Toru Oizumi, Osaka (JP); Daichi Imamura, Beijing (CN)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 140 days.

(21) Appl. No.: 14/352,612

(22) PCT Filed: Oct. 24, 2012

(86) PCT No.: PCT/JP2012/006813
§ 371 (c)(1),
(2) Date: Apr. 17, 2014

(87) PCT Pub. No.: WO2013/069218
PCT Pub. Date: May 16, 2013

(65) Prior Publication Data
US 2014/0247801 A1 Sep. 4, 2014

(30) Foreign Application Priority Data

Nov. 7, 2011 (JP) ................................. 2011-243353

(51) Int. Cl.
*H04Q 9/00* (2006.01)
*H04L 5/00* (2006.01)
(52) U.S. Cl.
CPC ................................... *H04L 5/0037* (2013.01)

(58) Field of Classification Search
CPC . H04W 52/0216; H04W 92/20; H04W 36/06; G01S 19/06; H04L 5/0037
USPC ................................ 370/329; 455/450, 456.2
See application file for complete search history.

(56) References Cited

U.S. PATENT DOCUMENTS 5,812,952 A * 9/1998 On et al. ..................... 455/452.1
7,215,967 B1 * 5/2007 Kransmo et al. ............ 455/456.2
(Continued)

OTHER PUBLICATIONS

3GPP TS 36.211 V10.1.0, "Physical Channels and Modulation (Release 10)," Mar. 2011, 3rd Generation Partnership Project; Technical Specification Group Radio Access Network; Evolved Universal Terrestrial Radio Access (E-UTRA).

(Continued)

*Primary Examiner* — Wanda Z Russell
(74) *Attorney, Agent, or Firm* — Pearne & Gordon LLP

(57) ABSTRACT

The present disclosure enables dynamic switching to a frame format different from the UL-DL configuration set by an SIB, and in particular switching to a downlink communication subframe from an uplink communication subframe, while also enabling effective utilization of downlink communication subframes. A base station uses "UL/DL communication subframe switching information" included in a DCI sent by a downlink communication subframe to instruct a terminal whether or not to perform uplink communication to a DCI using one or more uplink-specific communication subframes, and also gives instructions whether to perform uplink communication or downlink communication on an uplink communication subframe switchable to a downlink communication subframe.

7 Claims, 12 Drawing Sheets

(56) References Cited

U.S. PATENT DOCUMENTS

| | | | |
|---|---|---|---|
| 2008/0293426 A1* | 11/2008 | Kim et al. | 455/450 |
| 2010/0067411 A1* | 3/2010 | Shinozaki | 370/280 |
| 2010/0215012 A1* | 8/2010 | Cho et al. | 370/329 |
| 2011/0013543 A1* | 1/2011 | Lim et al. | 370/281 |
| 2011/0211543 A1* | 9/2011 | Frederiksen et al. | 370/329 |
| 2014/0177488 A1* | 6/2014 | Yang et al. | 370/280 |

OTHER PUBLICATIONS

3GPP TS 36.212 V10.1.0, "Multiplexing and Channel Coding (Release 10)," Mar. 2011, 3rd Generation Partnership Project; Technical Specification Group Radio Access Network; Evolved Universal Terrestrial Radio Access (E-UTRA).

3GPP TS 36.213 V10.1.0, "Physical Layer Procedures (Release 10)," Mar. 2011, 3rd Generation Partnership Project; Technical Specification Group Radio Access Network; Evolved Universal Terrestrial Radio Access (E-UTRA).

3GPP R1-113452, "Discussion on support of different TDD UL-DL configurations on different bands," Oct. 2011, Zhuhai, China.

Sharp, Fast uplink-downlink re-configuration with traffic adaptation by PHY layer signaling, 3GPP TSG-RAN WG1 #66, R1-112487, Aug. 2011, pp. 1-2, Athens, Greece.

Email discussion rapporteur (CATT), Summary of email discussion on simulation assumptions for study on further enhancements to LTE TDD for DL-UL interference management and traffic adaptation, 3GPP TSG RAN WG1 Meeting #66, R1-112884, Aug. 2011, pp. 1-8, Athens, Greece.

International Search Report for Application No. PCT/JP2012/006813 dated Jan. 29, 2013.

* cited by examiner

TERMINAL DEVICE, BASE STATION DEVICE, TRANSMISSION METHOD AND RECEPTION METHOD

TECHNICAL FIELD

The present invention relates to a terminal apparatus, a base station apparatus, a transmission method and a reception method that switch between frame formats.

BACKGROUND ART

In 3rd Generation Partnership Project Radio Access Network Long Term Evolution (3GPP-LTE (hereinafter referred to as LTE)), Orthogonal Frequency Division Multiple Access (OFDMA) is adopted as a downlink communication scheme, and Single Carrier Frequency Division Multiple Access (SC-FDMA) is adopted as an uplink communication scheme (e.g., see NPL-1, NPL-2, and NPL-3).

In LTE, a radio communication base station apparatus (hereinafter abbreviated as "base station") performs communication by allocating a resource block (RB) in a system band to a radio communication terminal apparatus (hereinafter abbreviated as "terminal") for every time unit called "subframe." The base station also transmits assignment control information (i.e., L1/L2 control information) for indicating the result of resource allocation for downlink data and uplink data to the terminal. The assignment control information is transmitted to the terminal through a downlink control channel such as a Physical Downlink Control Channel (PDCCH).

Here, a resource region to which a PDCCH is to be mapped is specified, and as shown in FIG. 1, a PDCCH covers the entire system bandwidth in the frequency-axis direction and the region occupied by the PDCCH in the time-axis direction varies between the top OFDM symbol and third OFDM symbol in a single subframe. The signal indicating the range of OFDM symbols occupied by a PDCCH in the time direction is indicated by the base station to the terminal through a Physical Control Format Indicator Channel (PCFICH).

Each PDCCH also occupies a resource consisting of one or more consecutive control channel elements (CCEs). In a PDCCH, one CCE consists of 36 resource elements (RE). In LTE, the number of CCEs occupied by a PDCCH (CCE aggregation level, or simply aggregation level) is selected from 1, 2, 4, and 8 depending on the number of information bits of assignment control information or the channel condition of a terminal. In LTE, a frequency band having a system bandwidth of up to 20 MHz is supported.

Assignment control information transmitted from a base station is referred to as downlink control information (DCI). When assigning a plurality of terminals to one subframe, the base station transmits a plurality of DCIs, simultaneously. In this case, in order to identify the terminal of the transmission destination of each DCI, the base station transmits the DCI with CRC bits masked (or scrambled) with the terminal ID of the transmission destination and included in the DCI. Then, the terminal performs de-masking (or descrambling) of the CRC bits of a plurality of DCIs possibly directed to the terminal, with its own ID, thereby blind-decoding a PDCCH to detect the DCI directed to the terminal.

The DCI also includes information (resource allocation information (for example, the number of allocated resource blocks)) regarding a Physical Downlink Shared Channel (PDSCH) resource and a Physical Uplink Shared Channel (PUSCH) resource allocated to a terminal by the base station. In addition, DCI includes a Modulation and channel Coding Scheme (MCS) (for example, information indicating an M-ary modulation number and/or a transport block size with respect to the number of allocated resource blocks) allocated to the terminal by the base station, for example. Furthermore, the DCI has a plurality of formats for uplink, downlink Multiple Input Multiple Output (MIMO) transmission, and downlink non-consecutive band allocation. The terminal needs to receive both downlink assignment control information (i.e., assignment control information about downlink: DL assignment) and uplink assignment control information (i.e., assignment control information about uplink: UL grant) which have a plurality of formats.

For downlink assignment control information, formats of a plurality of sizes are defined in accordance with a transmission antenna control method or a resource assignment method for a base station, for example. Among the plurality of formats, a downlink assignment control information format for consecutive band allocation (hereinafter simply referred to as "downlink assignment control information") and an uplink assignment control information format for consecutive band allocation (hereinafter simply referred to as "uplink assignment control information") have the same size. These formats (i.e., DCI formats) include type information (for example, a one-bit flag) indicating the type of assignment control information (downlink assignment control information or uplink assignment control information). Thus, even if the DCI indicating downlink assignment control information and DCI indicating uplink assignment control information have the same size, the terminal can determine whether the specific DCI indicates downlink assignment control information or uplink assignment control information by checking the type information included in assignment control information.

The DCI format in which uplink assignment control information for consecutive band allocation is transmitted is referred to as "DCI format 0" (hereinafter referred to as "DCI 0"), and the DCI format in which downlink assignment control information for consecutive band allocation is transmitted is referred to as "DCI format 1A" (hereinafter referred to as "DCI 1A"). DCI 0 and DCI 1A are of the same size and distinguishable from each other by referring to the type information as described above. For this reason, DCI 0 and DCI 1A will be collectively referred to as DCI 0/1A, hereinafter.

In addition to these DCI formats, there are other formats for downlink, such as DCI format 1 used for non-consecutive band allocation (hereinafter referred to as DCI 1) and DCI formats 2 and 2A used for assigning spatial multiplexing MIMO transmission (hereinafter referred to as DCIs 2 and 2A, respectively).

DCI 1, DCI 2, and DCI 2A are formats that are used dependently on the downlink transmission mode of a terminal (non-consecutive band allocation or spatial multiplexing MIMO transmission) and are configured for each terminal. In contrast, DCI 0/1A is a format that is used independently of the transmission mode and is usable for a terminal in any transmission mode, i.e., a format commonly used for every terminal. When DCI 0/1A is used, single-antenna transmission or a transmit diversity scheme is used as the default transmission mode.

Also, the standardization of 3GPP LTE-Advanced (hereinafter referred to as LTE-A), which provides a data transfer rate higher than that of LTE, has been started while keeping backward compatibility with LTE. In LTE-A, in order to achieve a downlink transfer rate of up to 1 Gbps or above and an uplink transfer rate of up to 500 Mbps or above, it is expected that base stations capable of performing communication using a wideband frequency of 40 MHz or higher and terminals designed for an optional LTE-A system (hereinafter referred to as LTE-A terminals) will be introduced. In addition, the LTE-A system is required to provide coverage supporting not only LTE-A terminals but also terminals designed for an LTE system (hereinafter referred to as LTE terminals).

In order to simultaneously achieve communication at an ultra-high speed transmission rate several times faster than a transmission rate in the LTE system and backward compatibility with the LTE system, the band for the LTE-A system is divided into "component bands" of 20 MHz or less, which is a bandwidth supported by the LTE system. That is, the "component band" is a band having a bandwidth of a maximum of 20 MHz and is defined as a base unit for the communication band.

In a Frequency Division Duplex (FDD) system, a "component band" in downlink (hereinafter, referred to as "downlink component band") may further be defined as a band resulting from division by downlink frequency band information in a BCH broadcast from a base station or a band defined by a distributed bandwidth when a downlink control channel (PDCCH) is distributed over the frequency domain. A "component band" in uplink (hereinafter, referred to as "uplink component band") may be defined as a base unit of a communication band of 20 MHz or less including a band resulting from division by uplink frequency band information in a BCH broadcast from a base station or a Physical Uplink Shared Channel (PUSCH) region near the center and including an LTE compatible PUCCH at both ends. Note that in 3GPP LTE-Advanced, a "component band" may be expressed as component carrier(s) or cell in English. In addition, the component carrier(s) may be abbreviated as CC(s).

The LTE-A system supports communication using a band which bundles several component carriers, so-called carrier aggregation. The throughput requirement for uplink communication is generally different from the throughput requirement for downlink communication, and therefore, studies are carried out on carrier aggregation in which the number of uplink component carriers and the number of downlink component carriers configured for LTE-A terminals are different, so-called asymmetric carrier aggregation in the LTE-A system. Furthermore, the LTE-A system supports a case where the number of uplink component carriers is asymmetric to the number of downlink component carriers and the respective component carriers have different frequency bandwidths.

In a Time Division Duplex (TDD) system, the downlink component carrier and uplink component carrier have the same frequency band, and downlink and uplink are switched on a time-division basis to achieve downlink communication and uplink communication. Therefore, in the case of TDD system, the downlink component carrier can be expressed as "downlink communication timing in the component carrier." Meanwhile, the uplink component carrier can be expressed as "uplink communication timing in the component carrier."

The downlink component carrier and uplink component carrier are switched based on a frame format called "UL-DL configuration" as shown in FIG. 2. The UL-DL configuration is indicated to a terminal via a broadcast signal called System Information Block (SIB) when the terminal starts communication with the base station. In the UL-DL configuration shown in FIG. 2, timings in subframe units (that is, 1 msec unit) of downlink communication (DL: Downlink) and uplink communication (UL: Uplink) per frame (10 msec) are configured. The UL-DL configuration makes it possible to construct a communication system capable of flexibly meeting throughput requirements for downlink communication and throughput requirements for uplink communication by changing a ratio between downlink communication subframes and uplink communication subframes. For example, FIG. 2 illustrates UL-DL configurations (Config 0 to 6) having different ratios between downlink communication subframes and uplink communication subframes. In FIG. 2, a downlink communication subframe (or DL subframe) is represented by "D," an uplink communication subframe (or UL subframe) is represented by "U" and a special subframe is represented by "S." The special subframe is a subframe at the time of switching from a downlink communication subframe to an uplink communication subframe. In the special subframe, downlink data communication may be performed as in the case of downlink communication subframes. In each UL-DL configuration shown in FIG. 2, subframes corresponding to 2 frames (20 subframes) are expressed in two stages: subframes "D" and "S" in the upper row shown in a hatch pattern used for downlink communication and subframes "U" in the lower row shown in a hatch pattern used for uplink communication.

In FIG. 2, a solid line connecting a downlink communication subframe or special subframe with an uplink communication subframe connects a downlink communication subframe or special subframe for indicating downlink data to a terminal with an uplink communication subframe for reporting an error detection result (e.g., ACK/NACK) for the above-described downlink data to the base station. For example, in Config 0 of FIG. 2, when downlink data is indicated to the terminal in a downlink communication subframe of #0, the error detection result corresponding to the downlink data is reported to the base station in an uplink communication subframe of #4. The error detection result corresponding to the downlink data is reported in an uplink communication subframe located at or after the fourth subframe position from the downlink communication subframe to which the downlink data is assigned.

Furthermore, in FIG. 2, a broken line connecting a downlink communication subframe or special subframe with an uplink communication subframe indicates which downlink communication subframe or special subframe to use to indicate uplink assignment control information (UL grant) corresponding to uplink data indicated by the terminal in the uplink communication subframe. For one uplink communication subframe, there is always one downlink communication subframe, and uplink assignment control information indicating the assignment of uplink data is indicated in a downlink communication subframe that is located at or before the fourth subframe position from an uplink communication subframe to which the uplink data is assigned and that results in a closest subframe difference.

Note that in Config 0, uplink assignment control information indicating the assignment of the uplink data corresponding to uplink data is associated so as to be indicated in downlink communication subframes, 6, 4, 6 and 4 subframes before uplink data transmission in subframes #2, #4, #7 and #9, respectively. Alternatively, it is also possible to switch the association so that indication is performed in downlink communication subframes at seventh subframes before uplink data transmission in subframes #2, #3, #7 and #8 respectively based on a 2-bit uplink communication index (UL index) included in uplink assignment control information indicating the assignment of uplink data. Moreover, not only switching between the two but also association may be performed so that indication is performed in downlink communication subframes 6, 4, 6 and 4 subframes before uplink data transmission in subframes #2, #4, #7 and #9 respectively, and at the same time indication may be performed in downlink communication subframes seventh subframes before uplink data transmission in subframes #2, #3, #7 and #8, respectively.

As shown in FIG. 2, in the UL-DL configuration, it is possible to select a ratio between uplink communication subframes and downlink communication subframes (including special subframes) from a range of 3:2 to 1:9. However, since the UL-DL configuration is a configuration common to all the terminals within a cell, switching is generally not performed in actual operations in consideration of interference to other systems or fluctuations from other systems. As the ratio between uplink communication subframes and downlink communication subframes in actual operations, 3:2 (Config 0), 2:3 (Config 1), 1:1 (Config 6) or the like are used so that both uplink communication and downlink communication can be equally performed. It is not a common practice to configure a UL-DL configuration specified for downlink communication such as Config 2 and Config 5 with ratios of 1:4, 1:9 or the like.

In an LTE-A system, as shown in FIG. 3A, a heterogeneous network is configured which includes a large cell (macro cell) covered by a macro base station and a small cell (picocell or femtocell) covered by a pico base station or femto base station. While many terminals are connected to a macro base station, a small number of terminals are connected to a pico base station or femto base station. In a macro base station, since the ratio between uplink communication traffic and downlink communication traffic is smoothed out among many terminals, there is less fluctuation in the ratio between uplink communication traffic and downlink communication traffic in a short time. That is, since many terminals are connected to the macro base station, some terminals may perform uplink communication while other terminals may perform downlink communication for a certain period, and the ratio between uplink communication traffic and downlink communication traffic is less likely to be significantly concentrated on either uplink communication or downlink communication. On the other hand, since a pico base station or femto base station connects only a small number of terminals, the ratio between uplink communication traffic and downlink communication traffic is more likely to be significantly concentrated on either uplink communication or downlink communication.

Thus, in the LTE-A system, studies are being carried out on temporally switching UL-DL configurations in accordance with a fluctuation in the ratio between uplink communication traffic and downlink communication traffic as shown in FIG. 3B.

There are various switching methods such as (1) a method that changes UL-DL configuration settings using SIB, (2) a method that indicates a UL-DL configuration which is different from the SIB-based setting, through RRC signaling and (3) a method that dynamically switches between uplink communication subframes and downlink communication subframes in subframe units. Generally, (1) requires the longest time for switching. In contrast, (3) is switching in subframe units and allows switching with the least amount of delay. It is effective to dynamically perform switching in subframe units as in (3) in order to more quickly respond to a fluctuation in the ratio between uplink communication traffic and downlink communication traffic.

FIG. 4A and FIG. 4B show an example of dynamically switching between UL-DL configurations in accordance with a fluctuation in the ratio between uplink communication traffic and downlink communication traffic with reference to NPL 4. In the drawings, an example is shown in which an uplink communication subframe of subframe #8 is switched to a downlink communication subframe in a cell for which Config 1 is configured. When there is a DCI intended for the terminal in a downlink communication subframe (subframe #4) corresponding to uplink communication in the uplink communication subframe of subframe #8 (FIG. 4A), the terminal performs uplink communication in the uplink communication subframe of subframe #8.

On the other hand, when there is no DCI intended for the terminal in a downlink communication subframe (subframe #4) corresponding to uplink communication in the uplink communication subframe of subframe #8 (FIG. 4B), the terminal does not perform uplink communication in the uplink communication subframe of corresponding subframe #8. When none of the terminals performs uplink communication, even if the base station performs downlink communication with a certain terminal, the terminal can perform downlink communication without receiving interference caused by uplink communication from other terminals. Therefore, in an uplink communication subframe for which no uplink communication is scheduled, the terminal performs blind decoding on a PDCCH with an assumption that the subframe is a downlink communication subframe. Accordingly, the base station can use the uplink communication subframe as a downlink communication subframe without giving explicit information to the terminal.

CITATION LIST

Non-Patent Literature

NPL 1
3GPP TS 36.211 V10.1.0, "Physical Channels and Modulation (Release 9)," March 2011
NPL 2
3GPP TS 36.212 V10.1.0, "Multiplexing and channel coding (Release 9)," March 2011
NPL 3
3GPP TS 36.213 V10.1.0, "Physical layer procedures (Release 9)," March 2011
NPL 4
3GPP R1-113452, "Discussion on support of different TDD UL-DL configurations on different bands," October 2011

SUMMARY OF INVENTION

Technical Problem

In FIG. 4B, when the uplink communication subframe of subframe #8 is used as a downlink communication subframe, it is not possible to perform downlink communication accompanied by corresponding uplink communication in a downlink communication subframe of subframe #4 at any terminal such as a Rel-10 terminal shown in FIG. 5A or a Rel-11 terminal shown in FIG. 5B. Therefore, even if the uplink communication subframe of subframe #8 can be used as a downlink communication subframe, the downlink communication subframe of subframe #4 cannot be effectively used after all.

It is an object of the present invention to provide a terminal apparatus, a base station apparatus, a transmission method and a reception method capable of effectively utilizing downlink communication subframes while enabling a dynamic switching to a frame format which is different from a UL-DL configuration set by SIB; particularly, a switching from an uplink communication subframe to a downlink communication subframe.

Solution to Problem

A base station apparatus according to an aspect of the present invention includes: a control section that generates UL/DL communication subframe switching information indicating whether to perform uplink communication corresponding to assignment control information in one or more communication subframes fixed to an uplink and indicating whether to perform uplink communication or downlink communication in an uplink communication subframe switchable to a downlink communication subframe; and a transmitting section that transmits the generated UL/DL communication subframe switching information to a terminal apparatus.

A terminal apparatus according to an aspect of the present invention includes: a receiving section that receives UL/DL communication subframe switching information indicating whether to perform uplink communication corresponding to assignment control information in one or more communication subframes fixed to an uplink and indicating whether to perform uplink communication or downlink communication in an uplink communication subframe switchable to a downlink communication subframe; a mapping section that performs mapping according to the indication of the received UL/DL communication subframe switching information; and a transmitting section that transmits a mapped signal to a base station apparatus.

A transmission method according to an aspect of the present invention includes: controlling a base station apparatus to generate UL/DL communication subframe switching information indicating whether to perform uplink communication corresponding to assignment control information in one or more communication subframes fixed to an uplink and indicating whether to perform uplink communication or downlink communication in an uplink communication subframe switchable to a downlink communication subframe; and transmitting the generated UL/DL communication subframe switching information from the base station apparatus to a terminal apparatus.

A reception method according to an aspect of the present invention includes: receiving from a base station apparatus by a terminal apparatus, UL/DL communication subframe switching information indicating whether to perform uplink communication corresponding to assignment control information in one or more communication subframes fixed to an uplink and indicating whether to perform uplink communication or downlink communication in an uplink communication subframe switchable to a downlink communication subframe; performing mapping of a transmission signal according to the indication of the received UL/DL communication subframe switching information; and transmitting the mapped transmission signal from the terminal apparatus to the base station apparatus.

Advantageous Effects of Invention

According to the present invention, it is possible to effectively utilize a downlink communication subframe while enabling a dynamic switching to a frame format which is different from a UL-DL configuration set by SIB; particularly, a switching from an uplink communication subframe to a downlink communication subframe.

DESCRIPTION OF EMBODIMENTS

Figure 6:
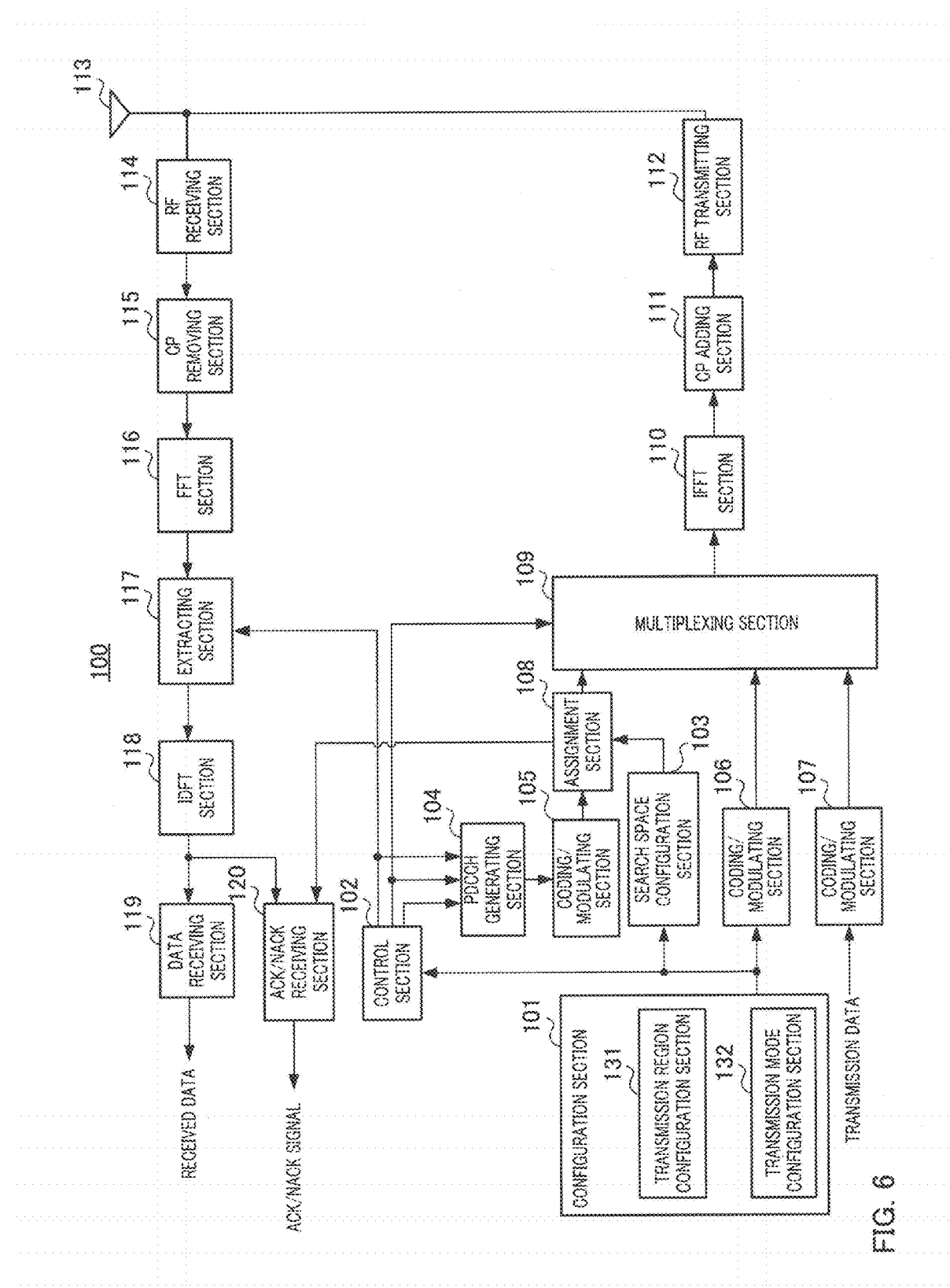
FIG. 6 is a block diagram illustrating a configuration of a base station according to Embodiment 1 of the present invention.

Hereinafter, an embodiment of the present invention will be described in detail with reference to the accompanying drawings.
(Embodiment)
[Overview of Communication System]
A communication system according to an embodiment of the present invention includes base station 100 and terminal 200. Base station 100 is an LTE-A base station and terminal 200 is an LTE-A terminal.
[Configuration of Base Station 100]
FIG. 6 is a block diagram illustrating a configuration of base station 100 according to Embodiment 1 of the present invention. In FIG. 6, base station 100 includes configuration section 101, control section 102, search space configuration section 103, PDCCH generating section 104, coding/modulating sections 105, 106 and 107, assignment section 108, multiplexing section 109, inverse fast Fourier transform (IFFT) section 110, cyclic prefix (CP) adding section 111, RF transmitting section 112, antenna 113, RF receiving section 114, CP removing section 115, fast Fourier transform (FFT) section 116, extracting section 117, inverse discrete Fourier transform (IDFT) section 118, data receiving section 119, and ACK/NACK receiving section 120.

Configuration section 101 configures a resource region for use in the transmission of DCI to terminal 200 and also configures each transmission mode for uplink and downlink for terminal 200. A resource region for use in the transmission of a DCI to terminal 200 is configured in accordance with a downlink data size indicated by the DCI. The downlink data size is defined as a transport block size. The configuration of a resource region and the configuration of a transmission mode are performed for each terminal 200 to be configured. Configuration information about the configured resource region and transmission mode is outputted to search space configuration section 103, and coding/modulating section 106. The configuration information about the configured resource region is outputted to control section 102.

Specifically, configuration section 101 includes transmission region configuration section 131 and transmission mode configuration section 132.

Transmission region configuration section 131 configures a PDCCH region used for transmission of a DCI to terminal 200 based on the downlink data size indicated by the DCI.

Transmission mode configuration section 132 configures the transmission mode (for example, spatial multiplexing MIMO transmission, beamforming transmission, or non-consecutive band allocation) of each of uplink and downlink for terminal 200.

The configuration information about a resource region and a transmission mode is indicated to each terminal 200 via coding/modulating section 106 as higher-layer control information (RRC control information or RRC signaling).

Control section 102 generates assignment control information including MCS information, resource (RB) allocation information, NDI (New Data Indicator) and "UL/DL communication subframe switching information" or the like based on configuration information relating to the resource region inputted from configuration section 101. As the resource allocation information, control section 102 generates uplink resource allocation information indicating an uplink resource (for example, a Physical Uplink Shared Channel (PUSCH)) to which uplink data from terminal 200 is assigned, or downlink resource allocation information indicating a downlink resource (for example, a Physical Downlink Shared Channel (PDSCH)) to which downlink data to terminal 200 is assigned. The details of the "UL/DL communication subframe switching information" will be described later.

Furthermore, on the basis of configuration information on the resource region inputted from configuration section 101, control section 102 generates, for each terminal 200, assignment control information (any one of DCI 0A and DCI 0B) based on a transmission mode of the uplink for terminal 200, assignment control information (any one of DCI 1, DCI 1B, DCI 1D, DCI 2, and DCI 2A) based on a transmission mode of the downlink, or assignment control information (DCI 0/1A) common to all the terminals.

For example, in order to improve throughput during normal data transmission, control section 102 generates assignment control information (any one of DCI 1, DCI 1B, DCI 1D, DCI 2, DCI 2A, DCI 0A, and DCI 0B) corresponding to the transmission mode of each terminal 200 so as to allow data transmission in the transmission mode configured for each terminal 200. As a result, data can be transmitted in the transmission mode configured for each terminal 200. Thus, the throughput can be improved.

However, a drastic change in the channel condition or a change in interference from an adjacent cell may cause frequent errors in receiving data with the transmission mode configured for each terminal 200. In this case, control section 102 generates assignment control information in the format (DCI 0/1A) common to all the terminals and transmits data in a robust default transmission mode. As a result, robust data transmission is allowed even if a propagation environment is drastically changed.

Also, when higher-layer control information (i.e., RRC signaling) is transmitted for the indication of a transmission mode change under a deteriorated channel condition, control section 102 generates assignment control information (i.e., DCI 0/1A) common to all the terminals and transmits the information using the default transmission mode. The number of information bits of DCI 0/1A common to all the terminals is smaller than those of DCI 1, DCI 2, DCI 2A, DCI 0A, and DCI 0B which are dependent on the transmission mode. For this reason, if the same number of CCEs is set, DCI 0/1A can perform coding at a lower coding rate than that related to DCI 1, DCI 2, DCI 2A, DCI 0A, and DCI 0B and allow for transmission. Thus, use of DCI 0/1A in control section 102 under a deteriorated channel condition enables a terminal having a poor channel condition to receive assignment control information (and data) with a low error rate.

Control section 102 also generates assignment control information for a shared channel (for example, DCI 1C and 1A) for the assignment of data common to a plurality of terminals, such as broadcast information and paging information, in addition to the assignment control information for the assignment of terminal-specific data.

From among the generated assignment control information for the assignment of terminal-specific data, control section 102 outputs MCS information, an NDI and "UL/DL communication subframe switching information" to PDCCH generating section 104, uplink resource allocation information to PDCCH generating section 104 and extracting section 117, and downlink resource allocation information to PDCCH generating section 104 and multiplexing section 109. Mapping to the mapping region of DCI is controlled by the downlink resource allocation information being outputted to multiplexing section 109. Control section 102 also outputs the generated assignment control information for a shared channel to PDCCH generating section 104.

Search space configuration section 103 configures a search space based on the search space configuration rule associated with the configured resource region indicated by configuration information inputted from configuration section 101. Each search space configuration rule is stored as a table in memory included in search space configuration section 103. A search space includes a common search space (C-SS) and a UE-specific search space (UE-SS). The common search space (C-SS) is a search space common to all the terminals, and the UE-specific search space (UE-SS) is a search space specific to each terminal.

PDCCH generating section 104 generates a DCI including assignment control information inputted from control section 102 for the assignment of terminal-specific data (i.e., uplink resource allocation information, downlink resource allocation information, MCS information, an NDI, and "UL/DL communication subframe switching information" or the like for each terminal) or a DCI including assignment control information for a shared channel (i.e., broadcast information, paging information, and other information common to terminals). During this process, PDCCH generating section 104 adds CRC bits to the uplink assignment control information and the downlink assignment control information generated for each terminal and masks (or scrambles) the CRC bits with a terminal ID. PDCCH generating section 104 then outputs the masked signals to coding/modulating section 105.

Coding/modulating section 105 modulates the DCI inputted from PDCCH generating section 104 after channel coding and outputs the modulated signals to assignment section 108. Coding/modulating section 105 determines a coding rate set on the basis of channel quality indicator (CQI) information reported from each terminal, so as to achieve a sufficient reception quality in each terminal. For example, as a distance between a terminal and a cell boundary decreases (i.e., as the channel quality of a terminal deteriorates), the coding rate to be set by coding/modulating section 105 decreases.

Assignment section 108 receives, from coding/modulating section 105, the DCI including assignment control information for a shared channel and DCI including assignment control information for the assignment of terminal-specific data to each terminal. Then, assignment section 108 assigns the received DCI to CCEs in a C-SS, or CCEs in a UE-SS for each terminal in accordance with search space information inputted from search space configuration section 103.

For example, assignment section 108 selects one DCI assignment region candidate from a group of DCI assignment region candidates in a C-SS. Assignment section 108 then assigns DCI including assignment control information for a shared channel to a CCE in the selected DCI assignment region candidate.

In the case of a DCI format specific to the terminal (for example, DCI 1, DCI 1B, DCI 1D, DCI 2, DCI 2A, DCI 0A, or DCI 0B), assignment section 108 allocates a CCE in a UE-SS configured for the terminal to the DCI. On the other hand, if the DCI format intended for the terminal is a DCI format common to all the terminals (for example, DCI 0/1A), assignment section 108 allocates a CCE in a C-SS or a CCE in a UE-SS configured for the terminal to the DCI.

The CCE aggregation level to be assigned to one DCI depends on the coding rate and the number of DCI bits (namely, the amount of assignment control information). For example, because the coding rate of DCI intended for a terminal located around a cell boundary is set low, more physical resources are required. Accordingly, assignment section 108 allocates more CCEs to a DCI for a terminal located around a cell boundary.

Assignment section 108 then outputs information about the CCEs allocated to the DCI to multiplexing section 109 and ACK/NACK receiving section 120. Assignment section 108 outputs the coded/modulated DCI to multiplexing section 109.

Coding/modulating section 106 modulates the configuration information received from configuration section 101 after channel coding and outputs the modulated configuration information to multiplexing section 109.

Coding/modulating section 107 modulates the input transmission data (downlink data) after channel coding and outputs the modulated transmission data signals to multiplexing section 109.

Multiplexing section 109 multiplexes the coded/modulated DCI signal inputted from assignment section 108, the configuration information inputted from coding/modulating section 106, and the data signal (namely, PDSCH signal) inputted from coding/modulating section 107 in the time domain and the frequency domain. Multiplexing section 109 maps the PDCCH signal and the data signal (PDSCH signal) on the basis of the downlink resource allocation information inputted from control section 102. Multiplexing section 109 then outputs the multiplexed signal to IFFT section 110. Multiplexing section 109 may also map the configuration information onto the PDSCH.

IFFT section 110 converts the multiplexed signal from multiplexing section 109 for each antenna into a time waveform. CP adding section 111 adds a CP to the signal in the time domain to obtain an OFDM signal and outputs the OFDM signal to RF transmitting section 112.

RF transmitting section 112 performs radio processing for transmission (for example, up-conversion or digital-analog (D/A) conversion) on the OFDM signal inputted from CP adding section 111 and transmits the resultant signal via antenna 113.

On the other hand, RF receiving section 114 performs radio processing for reception (for example, down-conversion or analog-digital (A/D) conversion) on radio signal received via antenna 113 at a receiving band and outputs the resultant received signal to CP removing section 115.

CP removing section 115 removes the CP from the received signal inputted from RF receiving section 114 and FFT section 116 transforms the received signal from which the CP is removed into frequency domain signals.

Extracting section 117 extracts uplink data from the frequency domain signal inputted from FFT section 116 on the basis of uplink resource allocation information inputted from control section 102 and outputs the extracted uplink data to IDFT section 118.

IDFT section 118 transforms uplink data which is the frequency domain signal inputted from extracting section 117 and outputs the time domain signal to data receiving section 119 and ACK/NACK receiving section 120.

Data receiving section 119 decodes the time domain signal inputted from IDFT section 118 and then outputs decoded uplink data as received data.

ACK/NACK receiving section 120 extracts, from the time domain signal inputted from IDFT section 118, ACK/NACK signal from each terminal for the downlink data (PDSCH signal). Specifically, ACK/NACK receiving section 120 extracts the ACK/NACK signal from an uplink control channel (e.g., a Physical Uplink Control Channel (PUCCH)) on the basis of the information inputted from assignment section 108. The uplink control channel is associated with the CCEs used for the transmission of the downlink assignment control information corresponding to the downlink data.

ACK/NACK receiving section 120 then determines the ACK or NACK of the extracted ACK/NACK signal.

One reason that the CCEs and the PUCCH are associated with each other is to eliminate the need for signaling sent by the base station to indicate, to each terminal, a PUCCH for use in transmitting ACK/NACK signal from the terminal, which thereby allows downlink communication resources to be used efficiently. Consequently, in accordance with this association, each terminal determines a PUCCH for use in transmitting an ACK/NACK signal on the basis of the CCEs to which downlink assignment control information (DCI) for the terminal is mapped.

[Configuration of Terminal 200]

Figure 7:
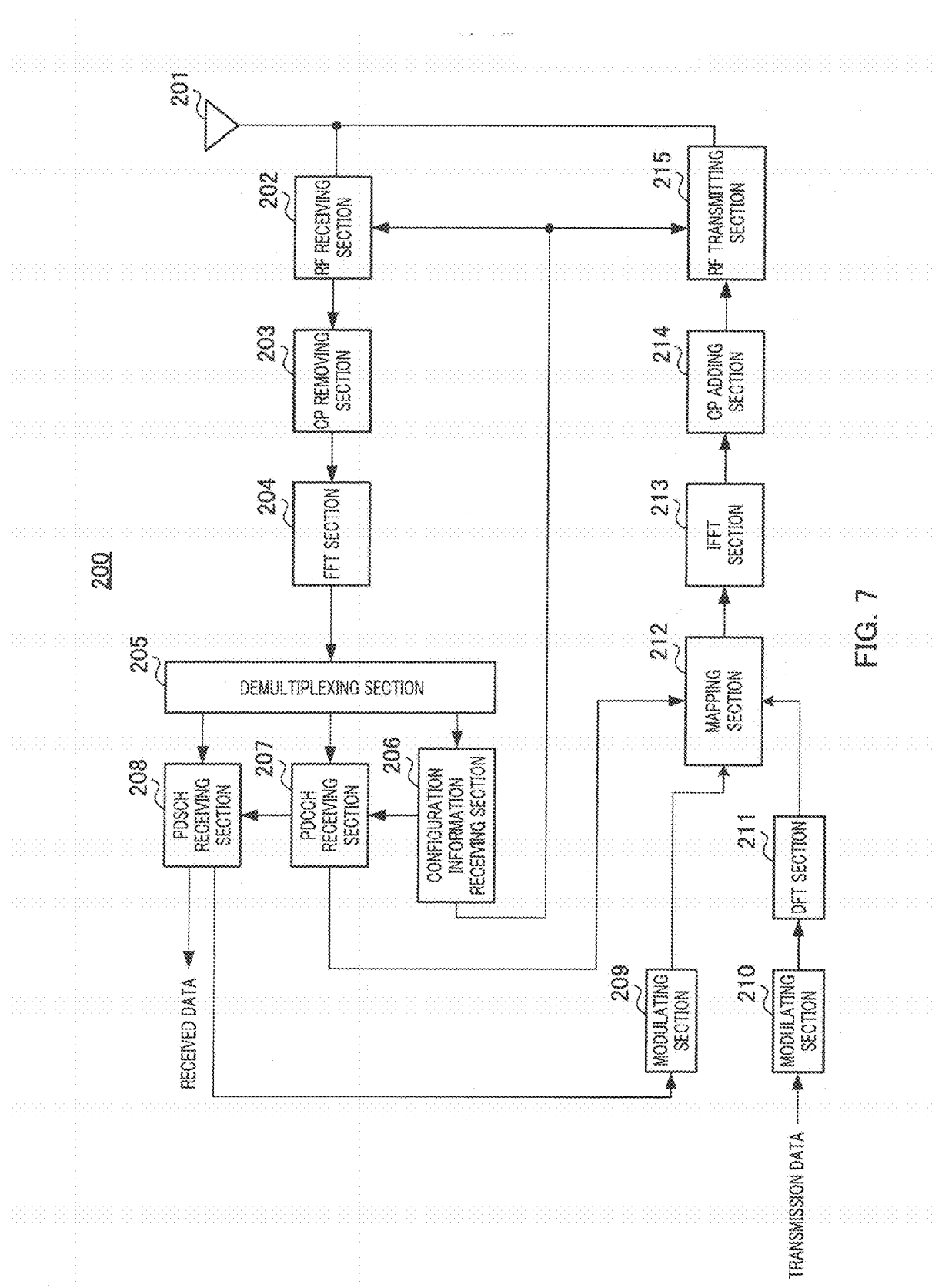
FIG. 7 is a block diagram illustrating a configuration of a terminal according to Embodiment 1 of the present invention.

FIG. 7 is a block diagram illustrating the configuration of terminal 200 according to Embodiment 1 of the present invention. In this case, terminal 200 is an LTE-A terminal.

In FIG. 7, terminal 200 includes antenna 201, RF receiving section 202, CP removing section 203, FFT section 204, demultiplexing section 205, configuration information receiving section 206, PDCCH receiving section 207, PDSCH receiving section 208, modulating sections 209 and 210, Discrete Fourier Transform (DFT) section 211, mapping section 212, IFFT section 213, CP adding section 214, and RF transmitting section 215.

RF receiving section 202 sets a reception band on the basis of band information inputted from configuration information receiving section 206. RF receiving section 202 performs radio processing for reception (e.g., down-conversion or analog-digital (A/D) conversion) on radio signal (OFDM signal in this case) received via antenna 201 in the reception band and outputs the resultant received signal to CP removing section 203. The received signal may include a PDSCH signal, a DCI (assignment control information), and higher-layer control information including configuration information. The DCI is allocated to a common search space (C-SS) configured for terminal 200 and other terminals or to a UE-specific search space (UE-SS) configured for terminal 200.

CP removing section 203 removes a CP from the received signal inputted from RF receiving section 202 and FFT section 204 transforms the received signal from which the CP is removed into frequency domain signal. The frequency domain signal is outputted to demultiplexing section 205.

Demultiplexing section 205 outputs to PDCCH receiving section 207, from the signal inputted from FFT section 204, a component that may include DCI a (i.e., signal extracted from a PDCCH region). Demultiplexing section 205 also outputs a higher-layer control signal (e.g., RRC signaling) including configuration information to configuration information receiving section 206 and data signal (i.e., PDSCH signal) to PDSCH receiving section 208. If the higher-layer control signal including the configuration information is transmitted through a PDSCH, demultiplexing section 205 extracts the configuration information from the signal received by PDSCH receiving section 208.

Configuration information receiving section 206 reads the following information from the higher-layer control signal inputted from demultiplexing section 205. That is, the information to be read includes: information indicating a terminal ID set for the terminal, information indicating a resource region configured for the terminal for use in transmitting DCI, information indicating a reference signal set for the terminal, and information indicating a transmission mode configured for the terminal.

The information indicating a terminal ID set for the terminal is outputted to PDCCH receiving section 207 as terminal ID information. The information indicating a resource region for use in transmitting a DCI is outputted to PDCCH receiving section 207 as search space region information. The information indicating a reference signal set for the terminal is outputted to PDCCH receiving section 207 as reference signal information. The information indicating a transmission mode configured for the terminal is outputted to PDCCH receiving section 207 as transmission mode information.

PDCCH receiving section 207 blind-decodes (monitors) the signal inputted from demultiplexing section 205 to obtain the DCI for the terminal. The blind decoding is performed on decoding target unit region candidates that are specified in search space configuration rules (region candidates in units of decoding targets). Each search space configuration rule is saved as a table in memory included in PDCCH receiving section 207. PDCCH receiving section 207 performs blind-decoding for a DCI format for the assignment of data common to all the terminals (for example, DCI 0/1A), a DCI format dependent on the transmission mode configured for the terminal (for example, DCI 1, DCI 2, DCI 2A, DCI 0A, and DCI 0B), and a DCI format for the assignment of a shared channel common to all the terminals (for example, DCI 1C and DCI 1A). This operation creates a DCI including assignment control information on each DCI format.

If a region indicated by search space region information inputted from configuration information receiving section 206 is a PDCCH region, PDCCH receiving section 207 performs, with respect to a C-SS, blind-decoding for the DCI formats for shared channel assignment (DCI 1C and DCI 1A) and the DCI format for the assignment of data common to all the terminals (DCI 0/1A) on the basis of the search space configuration rule. Specifically, for each decoding target unit region candidate in a C-SS (i.e., candidates of a CCE region assigned to terminal 200), PDCCH receiving section 207 performs demodulation and decoding based on the size of the DCI format for shared channel assignment and the size of the DCI format for the assignment of data common to all the terminals.

For the decoded signal, PDCCH receiving section 207 performs de-masking of CRC bits with an ID common to a plurality of terminals. PDCCH receiving section 207 then determines the signal for which "CRC=OK" (i.e. no error) is returned as a result of the de-masking to be the DCI including assignment control information for a shared channel.

For the decoded signals, PDCCH receiving section 207 further performs de-masking of the CRC bits with the terminal ID of the terminal indicated by the terminal ID information. PDCCH receiving section 207 then determines the signal for which "CRC=OK" (i.e. no error) is returned as a result of the de-masking to be the DCI including assignment control information for the terminal. In other words, in a C-SS, PDCCH receiving section 207 determines by means of a terminal ID (i.e., an ID common to a plurality of terminals or the terminal ID of terminal 200) whether assignment control information of DCI 0/1A is for a shared channel or for the assignment of data to the terminal.

PDCCH receiving section 207 calculates a UE-SS for the terminal for each CCE aggregation level with the terminal ID indicated by the terminal ID information inputted from configuration information receiving section 206. For each blind decoding region candidate in the obtained UE-SS, PDCCH receiving section 207 then performs demodulation and decoding based on the size of the DCI format corresponding to the transmission mode configured for the terminal (the transmission mode indicated by the transmission mode information) and the size of the DCI format common to all the terminals (DCI 0/1A). For the decoded signals, PDCCH receiving section 207 performs de-masking of CRC bits with the terminal ID of the terminal. PDCCH receiving section 207 determines the signal for which "CRC=OK" (i.e. no error) is returned as a result of de-masking to be the DCI for the terminal.

Upon reception of downlink assignment control information, PDCCH receiving section 207 outputs downlink resource allocation information in the DCI for the terminal to PDSCH receiving section 208. Upon reception of uplink assignment control information, PDCCH receiving section 207 outputs uplink resource allocation information to mapping section 212. PDCCH receiving section 207 also outputs the CCE number (CCE number for the leading CCE if the CCE aggregation level is plural) for the CCE used for the transmission of the DCI for the terminal (i.e., CCE used for the transmission of the signals for which "CRC=OK") to mapping section 212.

PDCCH receiving section 207 also outputs "UL/DL communication subframe switching information" included in the DCI for the terminal to mapping section 212. The details of the "UL/DL communication subframe switching information" will be described, hereinafter.

PDSCH receiving section 208 decodes the PDSCH signals inputted from demultiplexing section 205 on the basis of the downlink resource allocation information inputted from PDCCH receiving section 207 to obtain the received data (i.e., downlink data). That is, PDSCH receiving section 208 has a decoding circuit. PDSCH receiving section 208 also detects any error in the acquired received data (i.e., downlink data). If an error is found in the received data as a result of the error detection, PDSCH receiving section 208 generates a NACK signal as an ACK/NACK signal. If no error is found in the received data, PDSCH receiving section 208 generates an ACK signal as an ACK/NACK signal. The ACK/NACK signal is outputted to modulating section 209.

Modulating section 209 modulates the ACK/NACK signal inputted from PDSCH receiving section 208 and outputs the modulated ACK/NACK signal to mapping section 212.

Modulating section 210 modulates transmission data (i.e., uplink data) and outputs the modulated data signal to DFT section 211.

DFT section 211 transforms the data signal inputted from modulating section 210 into the frequency domain and outputs a plurality of resultant frequency components to mapping section 212.

Mapping section 212 maps the plurality of frequency components inputted from DFT section 211 to a PUSCH included in the uplink component carrier in accordance with the uplink resource allocation information and "UL/DL communication subframe switching information" inputted from PDCCH receiving section 207. Mapping section 212 also identifies the PUCCH in accordance with the CCE number and "UL/DL communication subframe switching information" inputted from PDCCH receiving section 207. Mapping section 212 then maps the ACK/NACK signal inputted from modulating section 209 to the identified PUCCH. The plurality of frequency components mapped to the PUSCH and ACK/NACK signal mapped to the PUCCH are outputted to IFFT section 213.

IFFT section 213 transforms the plurality of frequency components mapped to the PUSCH and ACK/NACK signals mapped to the PUCCH into time domain signals and CP adding section 214 adds a CP to the time domain waveform signal and outputs the signal to RF transmitting section 215.

RF transmitting section 215 is configured to be capable of changing a transmission band and configures the transmission band based on the band information inputted from configuration information receiving section 206. RF transmitting section 215 applies radio transmission processing (up-conversion, digital-analog (D/A) conversion or the like) to the signal inputted from CP adding section 214 and transmits the resultant signal via antenna 201.

[Operations of Base Station 100 and Terminal 200]

Next, the operations of base station 100 and terminal 200 configured in the manner described above will be described.

In base station 100, control section 102 adds "UL/DL communication subframe switching information" to downlink assignment control information (DL assignment) and uplink assignment control information (UL grant). The "UL/DL communication subframe switching information" is information for instructing terminal 200 about which subframe of a plurality of predetermined uplink communication subframes to use to transmit an error detection result corresponding to the downlink data indicated by DL assignment and the uplink data indicated by the UL grant.

In terminal 200, PDCCH receiving section 207 determines subframes in which blind decoding is performed based on "UL/DL communication subframe switching information" included in the DCI for the terminal. PDCCH receiving section 207 outputs the "UL/DL communication subframe switching information" to mapping section 212. Mapping section 212 determines the uplink communication subframe to which the error detection result corresponding to the downlink data and uplink data should be mapped according to the "UL/DL communication subframe switching information."

[Processing Flow in Terminal]

Figure 8:
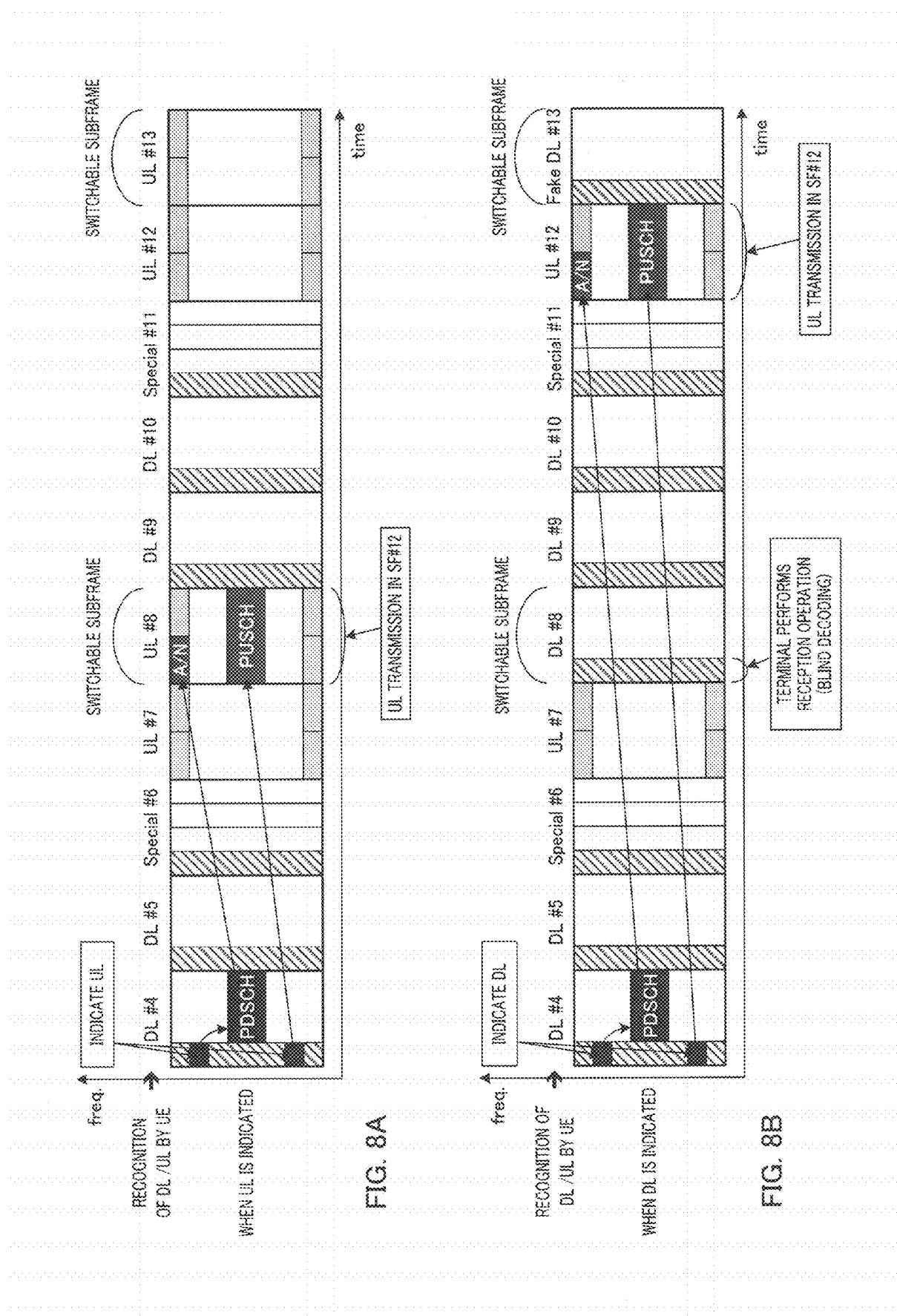
FIGS. 8A and 8B illustrate a frame format when a UL-DL configuration indicated by SIB is Config 1.

Hereinafter, the processing on the "UL/DL communication subframe switching information" in the terminal will be described in detail using FIGS. 8A and 8B, and FIG. 9. The example in FIGS. 8A and 8B shows a frame format when a UL-DL configuration indicated by SIB is Config 1. In FIGS. 8A and 8B, subframes #8 and #13 are assumed to be "switchable subframes." It is predetermined between the base station and the terminal that the error detection result for the downlink data and uplink data corresponding to the downlink communication subframe of subframe #4 is reported in subframe #8 which is a switchable subframe or subframe #12 which is a communication subframe fixed to the uplink (uplink communication subframe switchable to a downlink communication subframe).

Note that, switchable subframes are commonly configured beforehand between the base station and the terminal and may be configured through RRC signaling or indicating via SIB.

Note that the switchable subframes may not necessarily be configured beforehand. However, at this time, the terminal assumes that all subframes other than an uplink communication subframe after a special subframe are switchable. As a result, the number of times blind decoding is performed in the terminal increases, but an effect of eliminating the necessity for signaling for the configuration and allowing simplification is brought about.

Hereinafter, a case will be described where an uplink communication subframe is switched to a downlink communication subframe as an example. The same applies to a case where a downlink communication subframe is switched to an uplink communication subframe, and therefore description thereof will be omitted.

Figure 9:
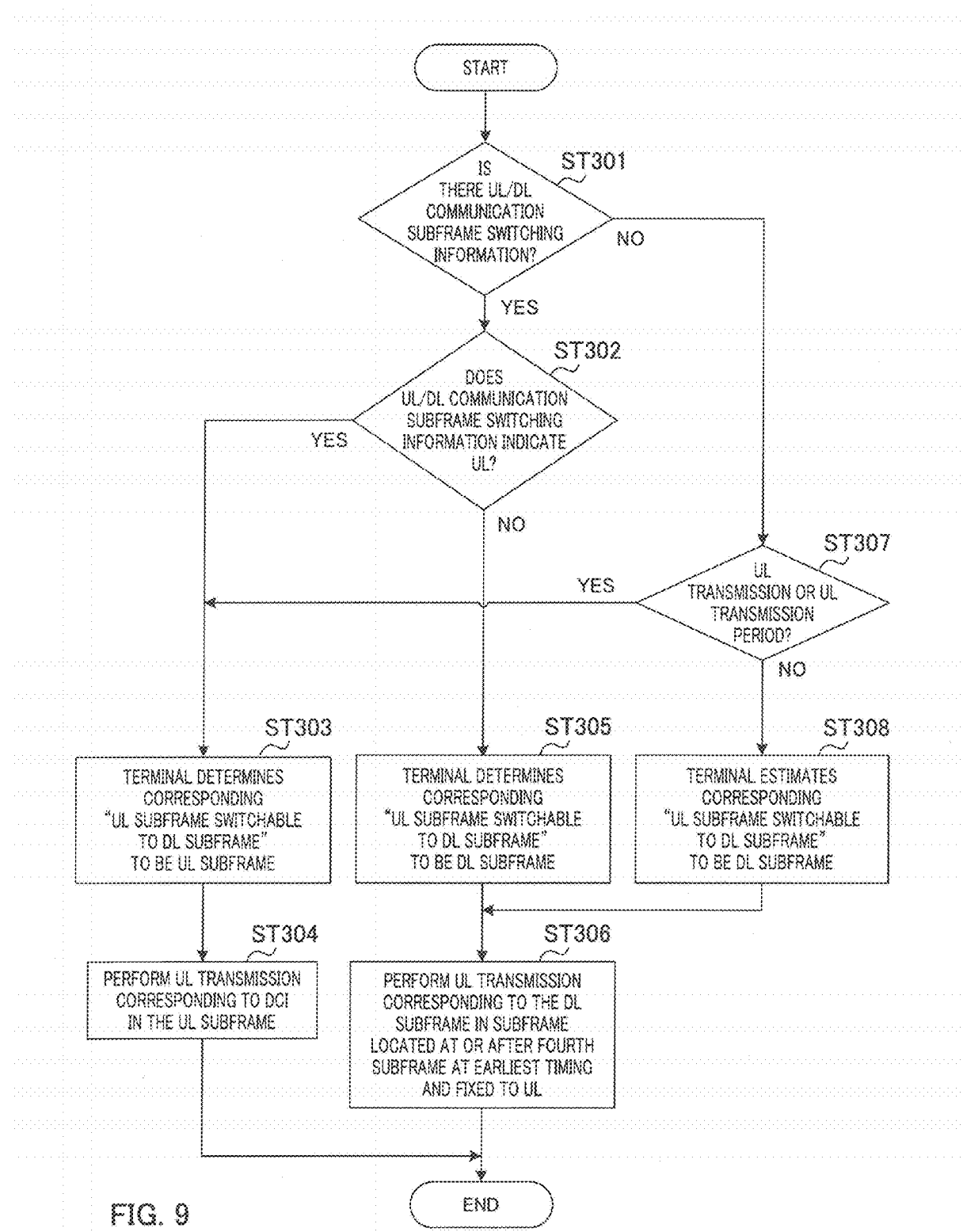
FIG. 9 is a flowchart illustrating a processing procedure in accordance with UL/DL communication subframe switching information.

FIG. 9 illustrates a processing flow in the terminal. Hereinafter, a case where the terminal receives "UL/DL communication subframe switching information" indicated with DL assignment and UL grant and a case where the terminal does not receive "UL/DL communication subframe switching information" (that is, neither DL assignment nor UL grant is received) will be described in detail with reference to FIG. 9. A description will be also given in detail using FIG. 9 for a case where the received "UL/DL communication subframe switching information" indicates "uplink communication" as well as a case where "UL/DL communication subframe switching information" indicates "downlink communication" upon reception of "UL/DL communication subframe switching information" by the terminal. In FIG. 9, in step (hereinafter, abbreviated as "ST") 301, terminal 200 determines whether "UL/DL communication subframe switching information" has been received or not. Upon determining that the "UL/DL communication subframe switching information" has been received, the processing flow moves to ST302 or upon determining that the "UL/DL communication subframe switching information" has not been received, the processing flow moves to ST307.

In ST302, terminal 200 determines whether or not the received "UL/DL communication subframe switching information" (e.g., 1-bit information) indicates uplink communication. When the received "UL/DL communication subframe switching information" indicates uplink communication, the processing flow moves to ST303, while, when the received "UL/DL communication subframe switching information" does not indicate uplink communication, that is, indicates downlink communication, the processing flow moves to ST305.

[Indication of Uplink Communication]

In ST303, terminal 200 determines an uplink communication subframe switchable to a downlink communication subframe to be an uplink communication subframe. In the example of FIGS. 8A and 8B, in the downlink communication subframe of subframe #4, if the "UL/DL communication subframe switching information" indicates "uplink communication," terminal 200 determines subframe #8 which is an uplink communication subframe switchable to a downlink communication subframe to be an uplink communication subframe.

In ST304, terminal 200 transmits an error detection result corresponding to downlink data, and uplink data in the subframe.

[Indication of Downlink Communication]

In ST305, terminal 200 determines an uplink communication subframe switchable to a downlink communication subframe to be a downlink communication subframe. In the example of FIGS. 8A and 8B, in the downlink communication subframe of subframe #4, if the "UL/DL communication subframe switching information" indicates "downlink communication," terminal 200 determines subframe #8 which is an uplink communication subframe switchable to a downlink communication subframe to be a downlink communication subframe. In the subframe, terminal 200 blind-decodes a PDCCH to detect the DCI for the terminal. At this time, terminal 200 transmits the error detection result corresponding to downlink data, and uplink data in subframe #12 which is a communication subframe fixed to the uplink.

In ST306, when terminal 200 detects the DCI for the terminal in the subframe determined to be the downlink communication subframe (subframe #8 in the example of FIGS. 8A and 8B), terminal 200 transmits an error detection result of the downlink data corresponding to the DCI (that is, DL assignment and UL grant) and uplink data in a communication subframe that is located at or after the fourth subframe position from the downlink communication subframe and that is the earliest communication subframe fixed to the uplink (i.e., uplink communication subframe that is not switchable; subframe #12 in the example of FIGS. 8A and 8B). That is, uplink communication subframe #12 is newly defined which corresponds to subframe #8 switched to a downlink communication subframe.

Thus, in the DCI for the terminal in the downlink communication subframe of subframe #4, if the "UL/DL communication subframe switching information" indicates "downlink communication," base station 100 instructs terminal 200 to perform reception operation (blind decoding) in the downlink communication subframe of subframe #8. In addition, base station 100 instructs terminal 200 to transmit, in the uplink communication subframe of subframe #12, the error detection result corresponding to the downlink data received by terminal 200 in subframe #4 and uplink data corresponding to the uplink assignment control signal received by terminal 200 in subframe #4. That is, the uplink communication subframe corresponding to subframe #4 is switched to subframe #12. Using this method, base station 100 can simultaneously give two instructions to terminal 200 using one piece of information and thereby reduce the number of information bits to be indicated to terminal 200 and effectively indicate control information terminal 200.

Because of switching the uplink communication subframe corresponding to above-described subframe #4 and newly defining an uplink communication subframe corresponding to subframe #8 which has been switched to a downlink communication subframe, there may be a case where error detection results corresponding to a plurality of pieces of downlink data are present in the uplink communication subframe (both correspond to subframe #12 in the example of FIG. 8A and FIG. 8B). In this case, bundling (logical AND processing) may be performed among a plurality of bits or all error detection results may be transmitted without performing bundling. Likewise, when a plurality of pieces of uplink data are present in a certain uplink communication subframe, base station 100 and terminal 200 may determine beforehand to transmit any one piece of uplink data or transmit all pieces of uplink data. Base station 100 may also perform scheduling so as not to transmit a plurality of pieces of uplink data to terminal 200.

[No Indication on UL/DL Communication]

When terminal 200 fails to receive a DCI or when base station 100 itself does not indicate a DCI to terminal 200, terminal 200 cannot obtain "UL/DL communication subframe switching information." In this case, terminal 200 determines in ST307 whether there is any uplink communication in an uplink communication subframe switchable to a downlink communication subframe or whether the period corresponds to an uplink transmission period. The processing flow moves to ST303 when this condition is met or moves to ST308 when this condition is not met.

In ST308, terminal 200 estimates the uplink communication subframe switchable to a downlink communication subframe as a downlink communication subframe and blind-decodes a PDCCH to detect the DCI intended for the terminal in the subframe. After that, terminal 200 moves to aforementioned ST306.

Hereinafter, the condition in ST307 will be described. Terminal 200 can transmit a scheduling request for requesting the allocation of an uplink resource and transmit periodic channel quality information (periodic CQI) for a transmission period preset by base station 100. Terminal 200 can also carry out uplink data transmission not accompanied by uplink assignment control information (semi-persistent scheduling). Furthermore, when a NACK is indicated to terminal 200 as an error detection result corresponding to uplink data transmitted by terminal 200 using a HARQ indicator channel (PH-ICH: Physical HARQ Indicator Channel), it is possible to retransmit the uplink data not accompanied by uplink assignment control information. In such a case, since terminal 200 may perform uplink communication even if it does not receive the DCI for the terminal, terminal 200 always determines such a subframe to be an uplink communication subframe and performs uplink transmission.

Regarding the scheduling request and periodic CQI, terminal 200 determines an uplink communication subframe switchable to a downlink communication subframe to be an uplink communication subframe or estimates it as a downlink communication subframe not according to the presence or absence of transmission but according to whether or not the period is a transmission period.

[Details of Uplink Communication Subframe Switchable to Downlink Communication Subframe]

An uplink communication subframe switchable to a downlink communication subframe can be indicated by a combination of UL-DL configurations indicated by SIB and other UL-DL configurations (hereinafter, referred to as "switchable subframe indication format").

Figure 10A:
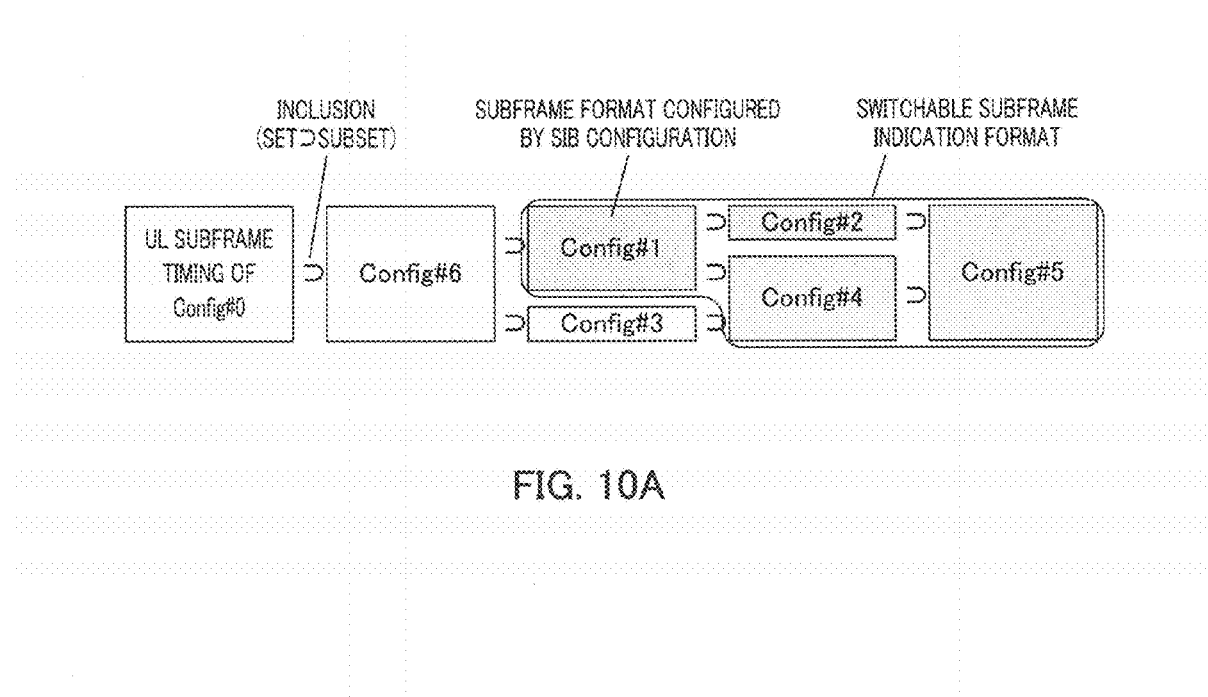
FIGS. 10A and 10B are diagrams provided for describing switchable subframe indication format.

In the switchable subframe indication format, timing of uplink communication subframes switchable to a downlink communication subframe are a subset (inclusion relation) of uplink communication subframe timing defined by the UL-DL configuration indicated by SIB as shown in FIG. 10A. In this case, the switchable subframe indication format indicated by the base station to the terminal is expressed by Config 0 to Config 6, and a subframe corresponding to "D" in the switchable subframe indication format becomes an uplink communication subframe switchable to a downlink communication subframe among subframes "U" in the UL-DL configuration indicated by SIB.

Figure 10B:
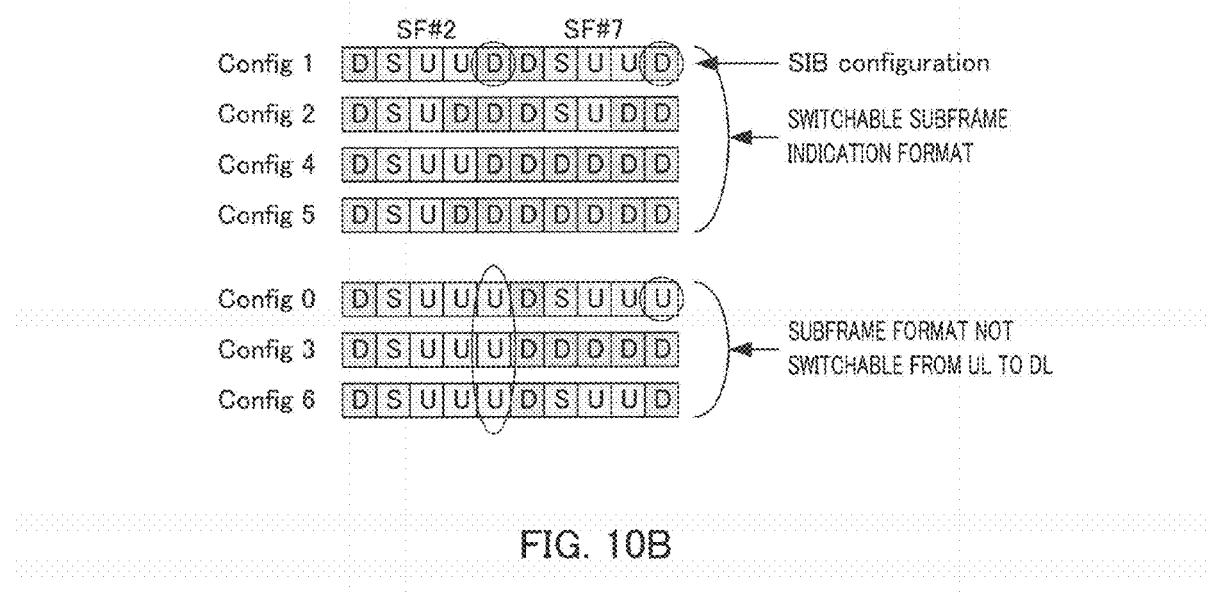

In the case of FIG. 10B, the UL-DL configuration indicated by SIB is assumed to be Config 1, and at this time, the switchable subframe indication format is selected from among Config 1, 2, 4 and 5. For example, when Config 2 is selected as the switchable subframe indication format, uplink communication subframes switchable to downlink communication subframes are identified as subframes #3 and #8

However, the switchable subframe indication format is not limited to above-described Config 0 to Config 6, but it needs only to be configured such that at least one subframe within one frame becomes a communication subframe fixed to the uplink (that is, an uplink communication subframe not switchable to a downlink communication subframe).

As described above, when "UL/DL communication subframe switching information" included in a DCI in a downlink communication subframe indicates "downlink communication," data that should have been transmitted in an uplink communication subframe switchable to a downlink communication subframe (that is, an error detection result corresponding to downlink data or uplink data) is indicated in a communication subframe fixed to the uplink. At this time, a subframe other than an uplink communication subframe switchable to the downlink communication subframe (that is, a subframe for indicating an error detection result corresponding to the above-described downlink data not transmitted or uplink data) may be a communication subframe at the earliest timing among communication subframes fixed to the uplink. When the switchable subframe indication format is expressed by Config 0 to 6 as shown in FIGS. 10A and 10B, such a subframe may be a communication subframe fixed to the uplink next to a special subframe (however, the subframe should be located at or after the fourth subframe position from the downlink communication subframe).

On the other hand, when the switchable subframe indication format is expressed by Config 0 to 6 as shown in FIGS. 10A and 10B, if "downlink communication" is indicated or not indicated to an uplink communication subframe switchable to a downlink communication subframe by "UL/DL communication subframe switching information," the uplink communication subframe in which uplink transmission corresponding to the DCI received by the terminal in the subframe may be a communication subframe fixed to the uplink next to a special subframe (however, the subframe should be located at or after the fourth subframe position from the downlink communication subframe).

Alternatively, when the switchable subframe indication format is expressed by Config 0 to 6 as shown in FIGS. 10A and 10B, if "downlink communication" is indicated or not indicated to an uplink communication subframe switchable to a downlink communication subframe using "UL/DL communication subframe switching information," an uplink communication subframe for performing uplink transmission corresponding to the DCI received by the terminal in the subframe may be an uplink communication subframe corresponding to a UL-DL configuration when the switchable subframe indication format is estimated as a UL-DL configuration indicated by SIB. That is, for example, when the UL-DL configuration indicated by SIB is Config 0 and when the switchable subframe indication format is Config 6, the switchable subframe is subframe #9 from FIG. 10B. In the subframe, the uplink communication subframe in which uplink transmission corresponding to the DCI received by the terminal is subframe #4 in the next frame shown in Config 6 of FIG. 2. In the uplink communication subframe switchable to a downlink communication subframe, this eliminates the necessity for newly defining timing of performing uplink transmission corresponding to the DCI when the terminal receives a DCI other than the transmission timing defined beforehand in Config 0 to 6 of FIG. 2, and it is possible to simplify the configurations of the base station and terminal.

In FIGS. 10A and 10B, when the UL-DL configuration indicated by SIB is Config 1, if the switchable subframe indication format is selected from among Config 0, 1 and 6, the switchable subframe indication format becomes a subset of downlink communication subframe timing defined by the UL-DL configuration indicated by SIB. Therefore, at this time, the switchable subframe indication format can be used to indicate the "downlink communication subframe switchable to an uplink communication subframe." That is, the combination of two UL-DL configurations makes it possible to express not only an "uplink communication subframe switchable to a downlink communication subframe" but also a "downlink communication subframe switchable to an uplink communication subframe."

When a downlink communication subframe is switched to an uplink communication subframe, the switchable subframe indication format is always set to any one of UL-DL configurations (Config 1, 2, 4 or 5 in the example in FIGS. 10A and 10B) which become a subset of uplink communication subframe timing defined in the UL-DL configuration (Config 1 in the example of FIGS. 10A and 10B) indicated by SIB. On the other hand, when an uplink communication subframe is switched to a downlink communication subframe, the switchable subframe indication format is always set to any one of UL-DL configurations (Config 0, 1 or 6 in the example of FIGS. 10A and 10B) which become a subset of downlink communication subframe timing defined in the UL-DL configuration indicated by SIB. No combination of UL-DL configurations is set which simultaneously includes "an uplink communication subframe switchable to a downlink communication subframe" and "a downlink communication subframe switchable to an uplink communication subframe" (Config 1 and 3, Config 2 and 3, and, Config 2 and 4).

[Details of "UL/DL Communication Subframe Switching Information"]

The above description assumes that downlink assignment control information and uplink assignment control information in a downlink communication subframe corresponding to an uplink communication subframe switchable to a downlink communication subframe include "UL/DL communication subframe switching information." However, the downlink assignment control information and uplink assignment control information in a downlink communication subframe corresponding to the communication subframe fixed to the uplink may include "UL/DL communication subframe switching information." In this case, since the number of DCI bits increases for assignment control information corresponding to a communication subframe fixed to the uplink, the DCI coding rate increases. On the other hand, the DCI size will no longer depend on an uplink communication subframe switchable to a downlink communication subframe. Thus, when the configuration of an uplink communication subframe switchable to a downlink communication subframe is changed between the base station and the terminal, this provides an effect that the terminal can blind-decode a PDCCH in a correct DCI size also for a period (ambiguity period) during which there is mismatch in recognition of an uplink communication subframe switchable to a downlink communication subframe between the base station and the terminal in a change transition state (e.g., a state in which the connection between the base station and the terminal is not stable).

Figure 1:
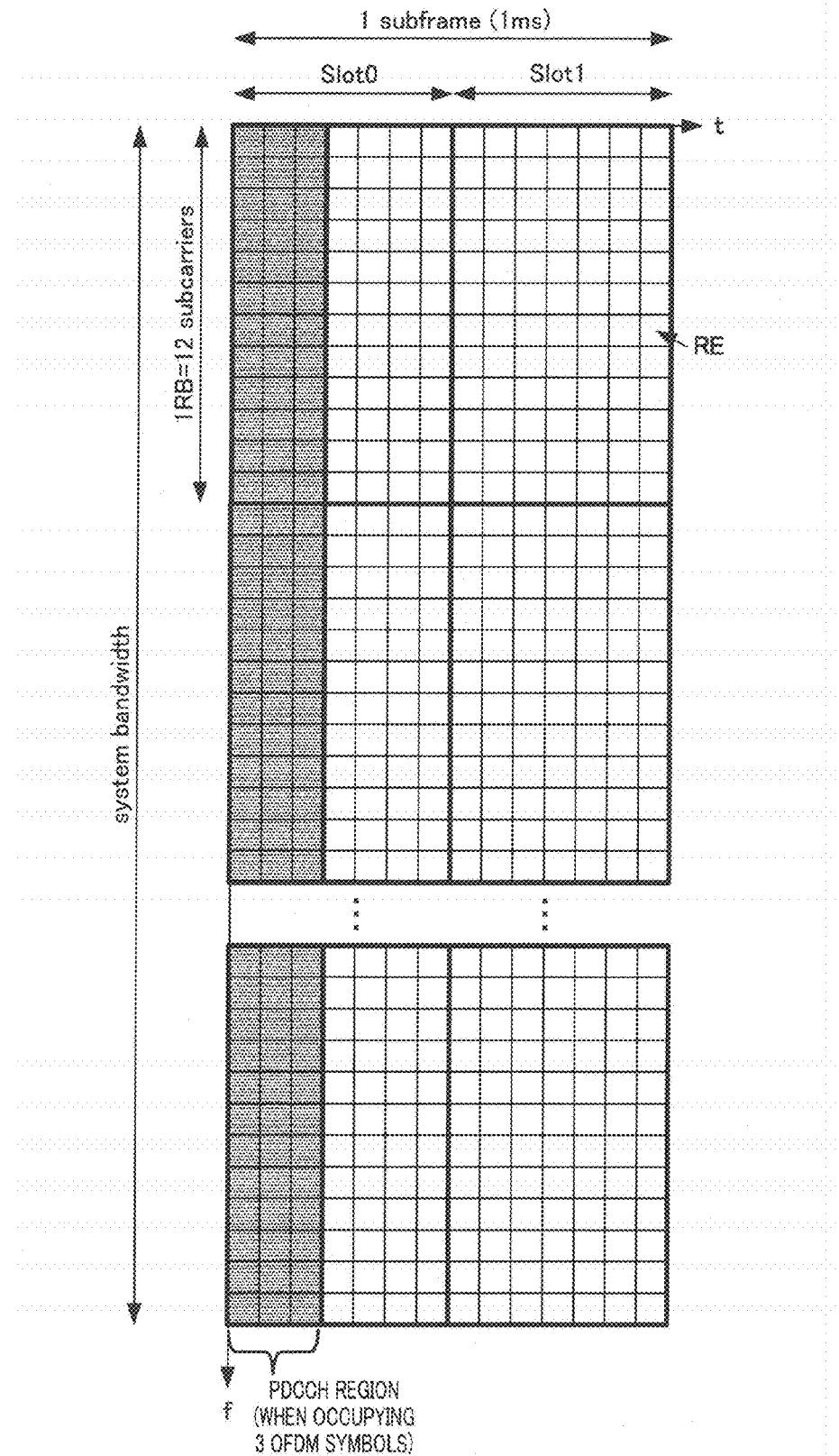
FIG. 1 is a diagram defining a resource region to which a PDCCH is mapped.
Figure 2:
FIG. 2 illustrates UL-DL configurations.
Figure 3A:
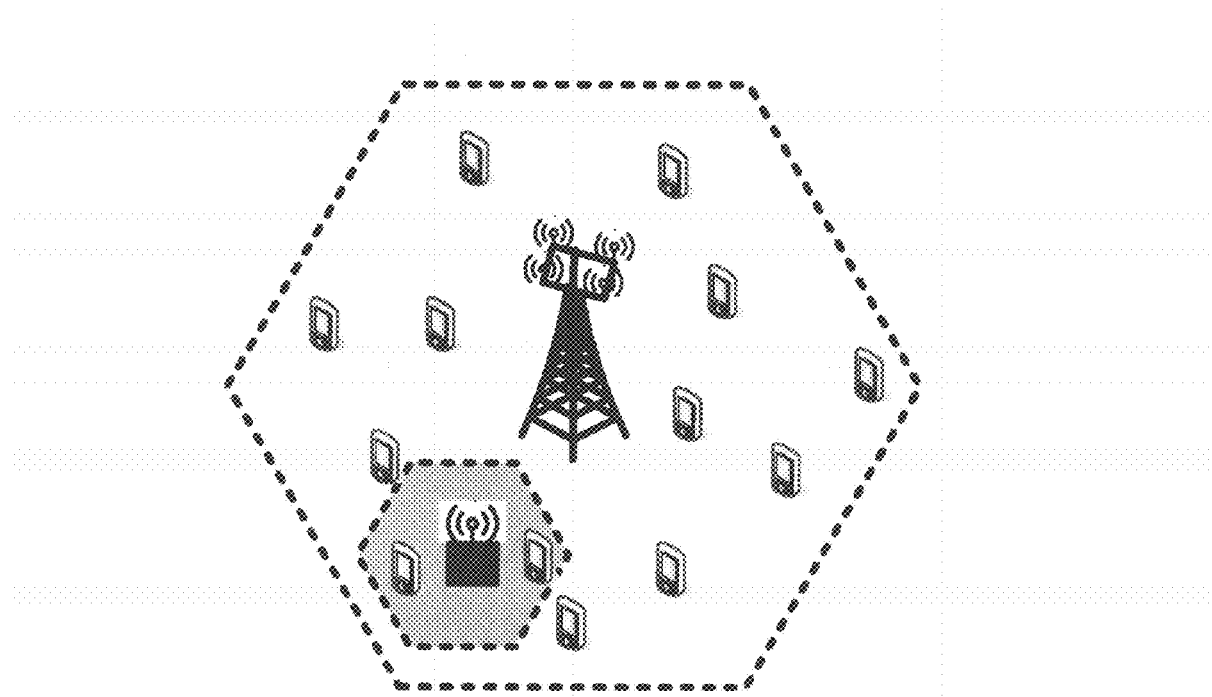
FIG. 3A illustrates a schematic configuration of an LTE-A system.
Figure 3B:
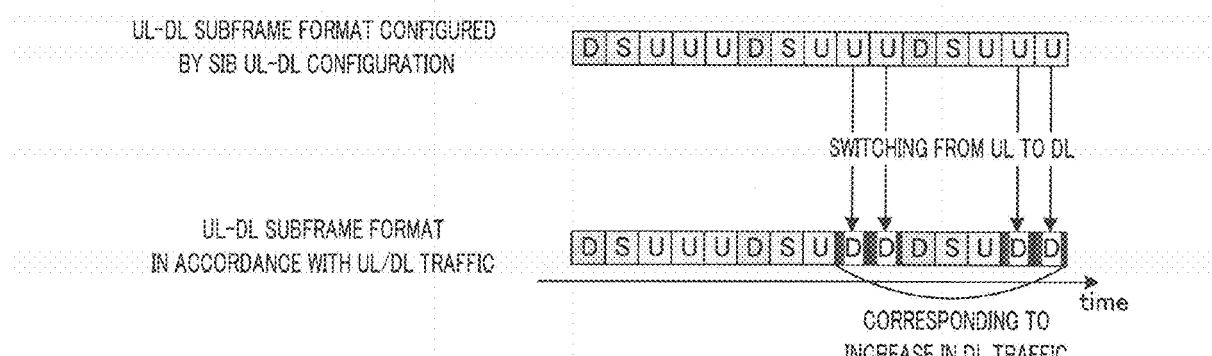
FIG. 3B illustrates how a UL-DL configuration is switched in accordance with a traffic fluctuation.
Figure 4A:
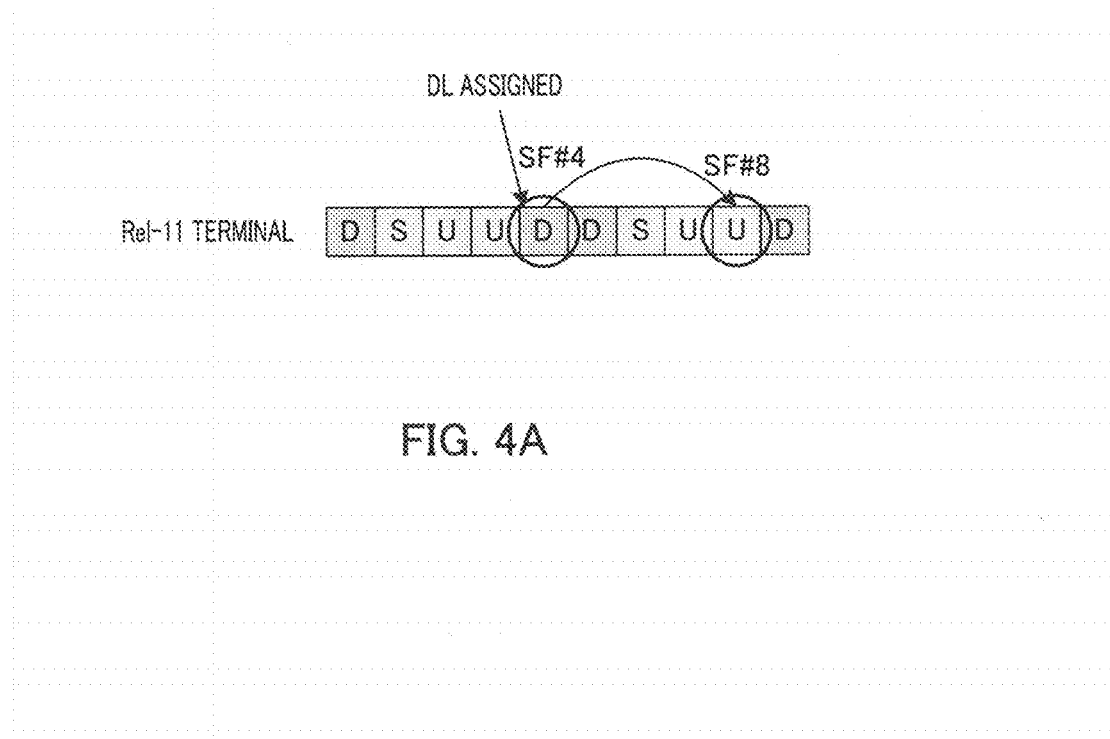
FIGS. 4A and 4B illustrate how a UL-DL configuration is dynamically switched.
Figure 4B:
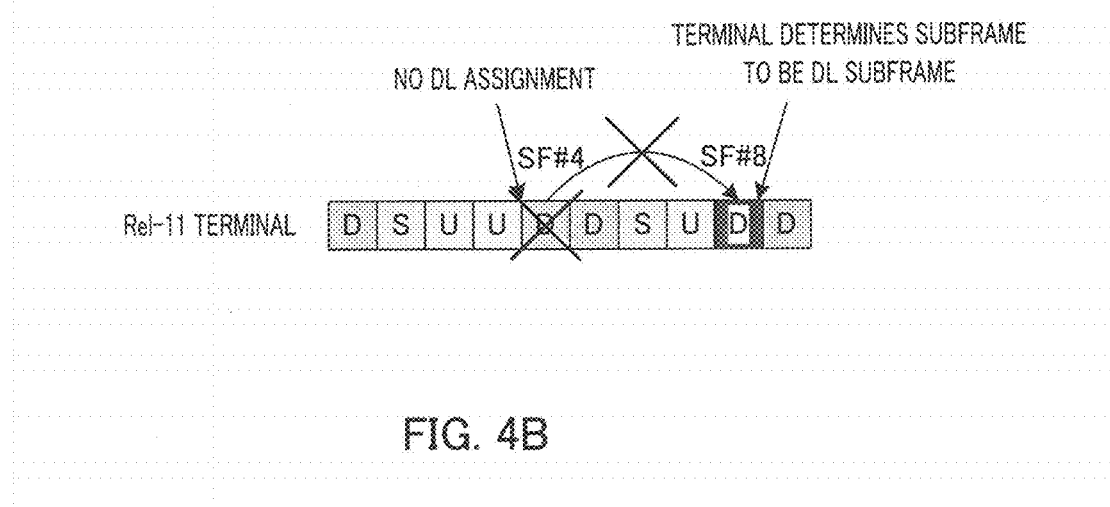
Figure 5A:
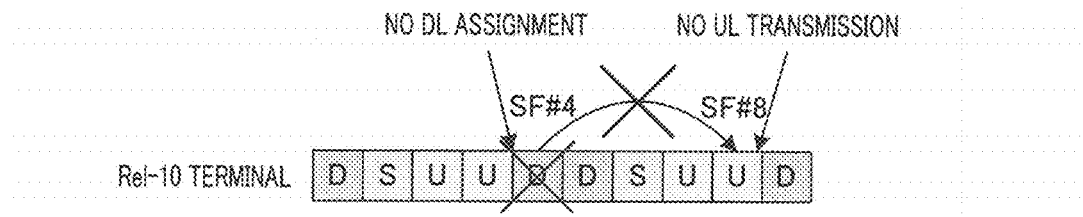
FIGS. 5A and 5B are diagrams provided for describing a problem to be solved.
Figure 5B:
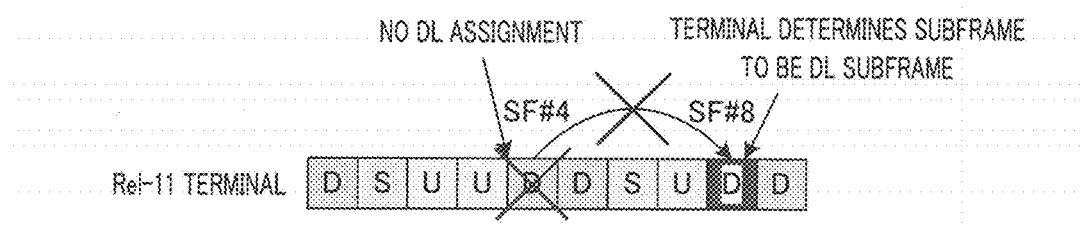

Even when the terminal receives downlink assignment control information and uplink assignment control information using the same downlink communication subframe, the uplink communication subframe in which an error detection result corresponding to downlink data is transmitted may be different from the uplink communication subframe in which uplink data is transmitted. In FIG. 2, according to Config 3, an error detection result corresponding to downlink data for the downlink assignment control information and uplink assignment control information received in subframe #8 is transmitted in subframe #13, and uplink data is transmitted in subframe #12, for example. At this time, an assumption is made that subframe #12 in which the uplink data is transmitted is a communication subframe fixed to the uplink and that subframe #13 in which the error detection result corresponding to the downlink data is transmitted is an uplink communication subframe switchable to a downlink communication subframe. At this time, the base station may indicate "UL/DL communication subframe switching information" also for uplink assignment control information corresponding to the uplink data transmitted in the communication subframe fixed to the uplink. In this case, since the number of DCI bits increases also for assignment control information corresponding to the communication subframe fixed to the uplink, the DCI coding rate increases. On the other hand, it is possible to set the same DCI size for downlink assignment control information and uplink assignment control information and to reduce the number of times blind decoding is performed in the terminal.

Figure 11A:
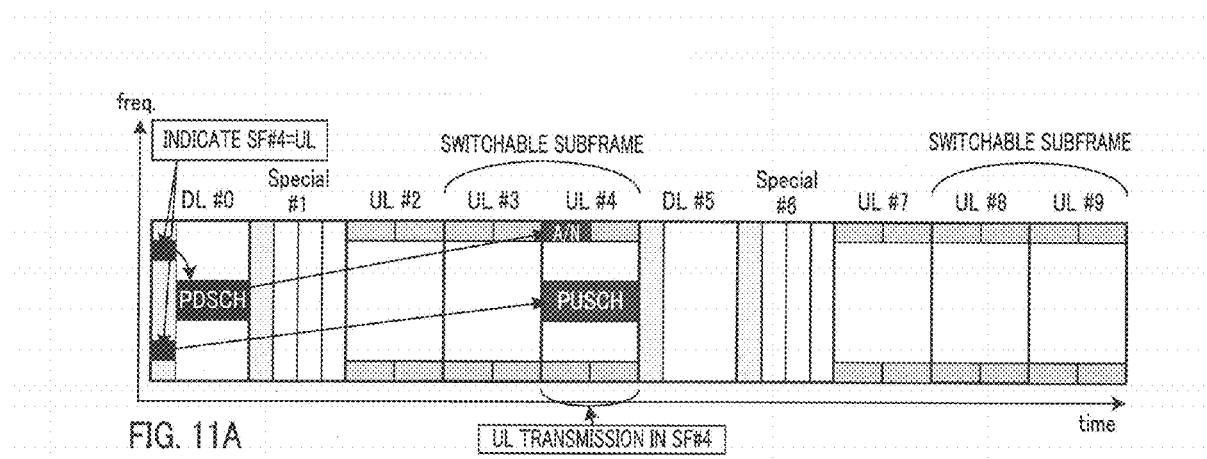
FIGS. 11A to 11D illustrate how "uplink communication" or "downlink communication" is indicated by 2-bit "UL/DL communication subframe switching information"
Figure 11B:
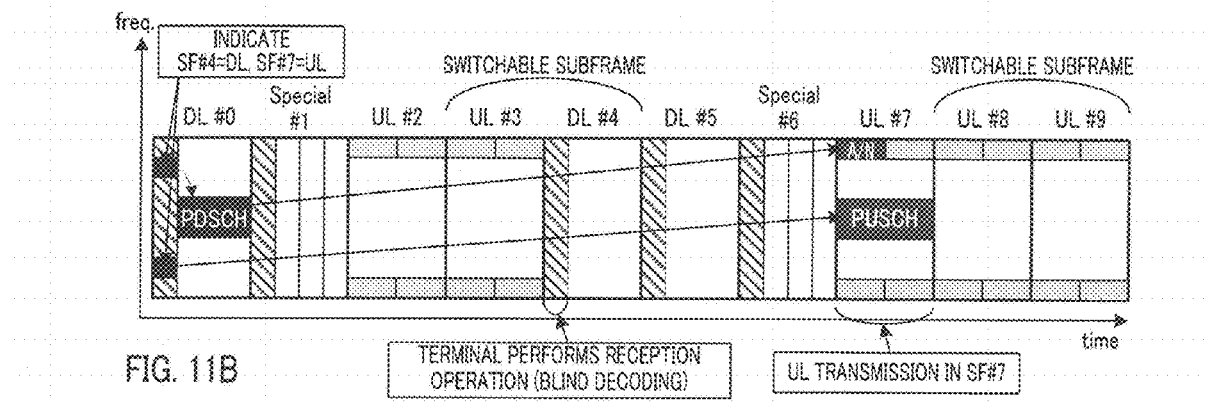
Figure 11C:
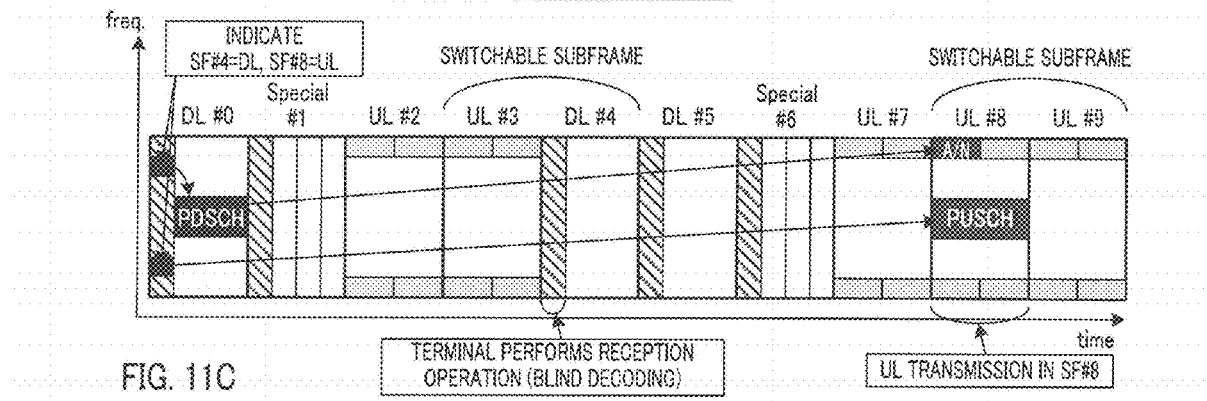
Figure 11D:
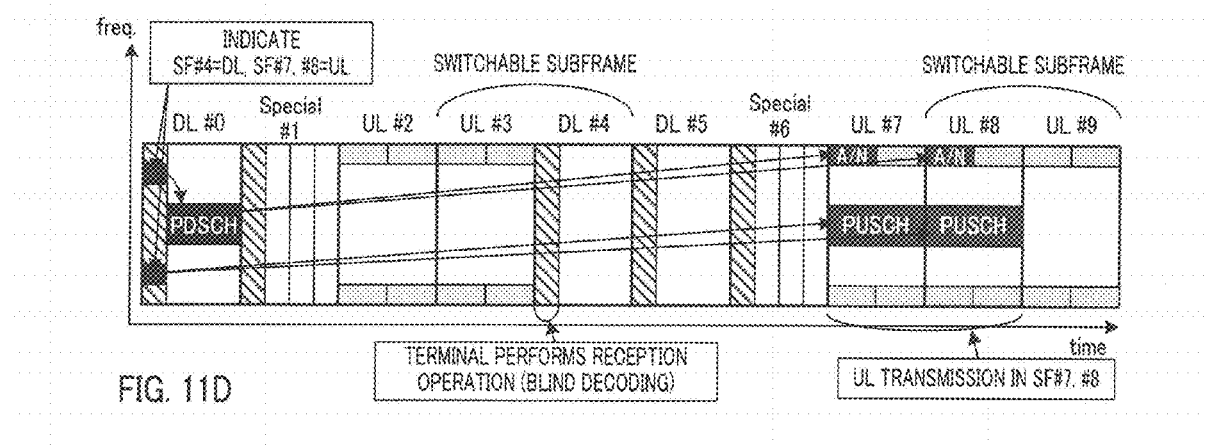

The "UL/DL communication subframe switching information" need not always be 1-bit information and the number of downlink communication subframes and uplink communication subframes indicated by the "UL/DL communication subframe switching information" need not always be one for the subframes. For example, using 2-bit "UL/DL communication subframe switching information" makes it possible to indicate, as shown in FIGS. 11A to 11D, whether subframes #4, #7 and #8 are uplink communication subframes or downlink communication subframes, respectively. In FIG. 11A, subframe #0 indicates "uplink communication" for subframe #4, and in FIG. 11B, subframe #0 indicates "downlink communication" for subframe #4 and "uplink communication" for subframe #7. Furthermore, in FIG. 11C, subframe #0 indicates "downlink communication" for subframe #4 and "uplink communication" for subframe #8. Moreover, in FIG. 11D, subframe #0 indicates "downlink communication" for subframe #4 and "uplink communication" for subframes #7 and #8.

The "UL/DL communication subframe switching information" can also indicate uplink communication in a plurality of uplink communication subframes such as an uplink communication index. In short, the "UL/DL communication subframe switching information" with one or more bits can indicate whether or not to use two or more subframes as uplink communication subframes or downlink communication subframes.

As described above, according to the present embodiment, the "UL/DL communication subframe switching information" included in a DCI indicated from the base station to the terminal in a downlink communication subframe can indicate whether or not to perform uplink communication for the DCI in one or more communication subframes fixed to the uplink and also indicate to the terminal about whether to perform uplink communication or downlink communication using an uplink communication subframe switchable to a downlink communication subframe. Thus, dynamic switching for each subframe, i.e., switching from an uplink communication subframe to a downlink communication subframe is made possible, and it is also made possible to effectively use downlink communication subframes for indicating assignment control information for uplink transmission from the terminal in an uplink communication subframe switchable to a downlink communication subframe. Since the base station can give the terminal two instructions simultaneously using one piece of "UL/DL communication subframe switching information," it is possible to reduce the number of bits for information indicated to the terminal and effectively indicate control information.

Figure 12:
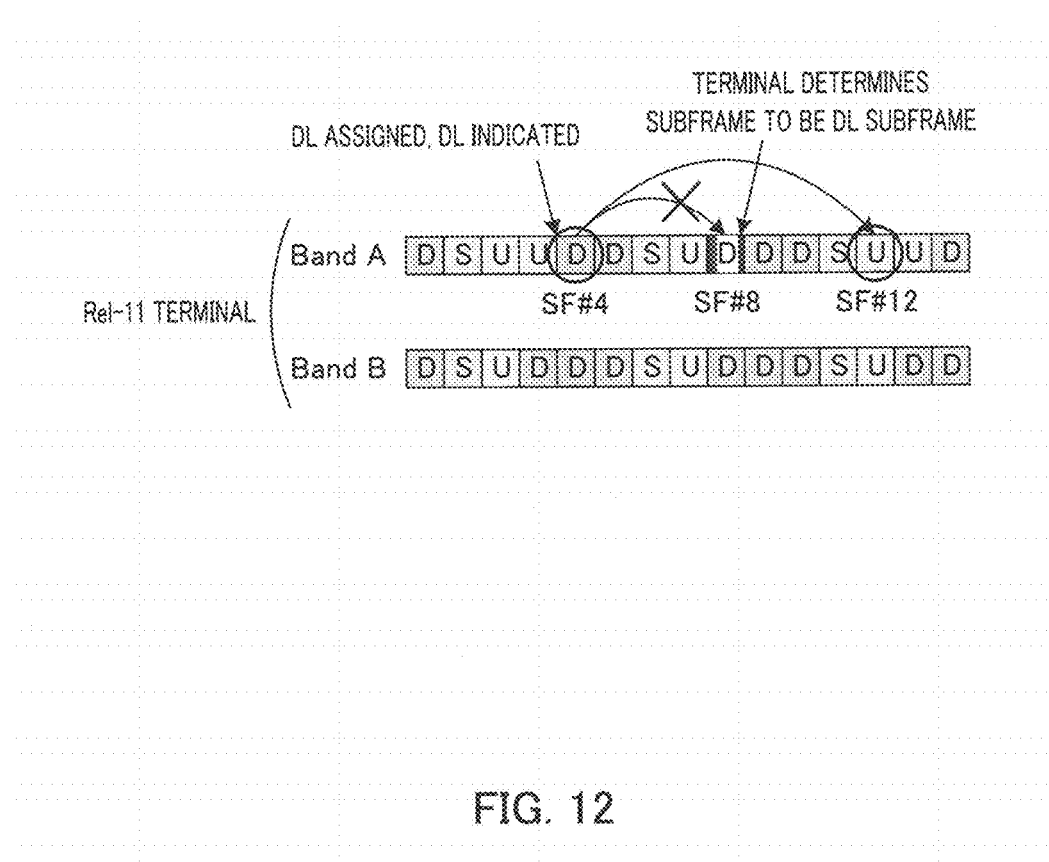
FIG. 12 is a diagram provided for describing an uplink communication subframe switchable to a downlink communication subframe when a different UL-DL configuration is configured for each carrier.

Although the present embodiment has been described with a case where carrier aggregation (CA) is not applied, as an example, the present invention is not limited to this case and is applicable to a case as shown in FIG. 12 where a different UL-DL configuration is configured for each carrier. Uplink communication subframes (subframes #3, #8 and #13 of band A in the example of FIG. 12) at timing at which subframes become downlink communication subframes on one carrier (frequency band) and become uplink communication subframes on the other carrier (frequency band) may be designated as uplink communication subframes switchable to downlink communication subframes. In short, the present invention is applicable to a case where an uplink communication subframe indicated by a UL-DL configuration indicated by SIB is dynamically used as a downlink communication subframe.

Each function block used in the description of the aforementioned embodiment may be implemented by software that functions by a computer executing a program, or by software in concert with hardware.

Each function block used in the description of the aforementioned embodiment may typically be implemented as an LSI constituted by an integrated circuit. These functional blocks may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI as a result of the advancement of semiconductor technology or a technology derivative of semiconductor technology, it is naturally also possible to carry out function block integration using this technology. Application of biotechnology is also possible.

The disclosure of Japanese Patent Application No. 2011-243353, filed on Nov. 7, 2011, including the specification, drawings, and abstract, is incorporated herein by reference in its entirety.

INDUSTRIAL APPLICABILITY

The present invention is useful for mobile communication systems, for example.

REFERENCE SIGNS LIST

101 Configuration section
102 Control section
103 Search space configuration section
104 PDCCH generating section
105, 106, 107 Coding/modulation section
108 Assignment section
109 Multiplexing section
110, 213 IFFT section
111, 214 CP adding section
112, 215 RF transmitting section
113, 201 Antenna
114, 202 RF receiving section
115, 203 CP removing section
116, 204 FFT section
117 Extracting section
118 IDFT section
119 Data receiving section
120 ACK/NACK receiving section
131 Transmission region configuration section
132 Transmission mode configuration section
205 Demultiplexing section
206 Configuration information receiving section
207 PDCCH receiving section
208 PDSCH receiving section
209, 210 Modulating section
211 DFT section
212 Mapping section

The invention claimed is:

1. A base station apparatus comprising:
   a control section that generates UL/DL communication subframe switching information indicating whether to perform uplink communication corresponding to assignment control information in one or more communication subframes fixed to an uplink and indicating whether to perform uplink communication or downlink communication in an uplink communication subframe switchable to a downlink communication subframe; and a transmitting section that transmits the generated UL/DL communication subframe switching information to a terminal apparatus, wherein an uplink communication subframe for transmitting an error detection result for downlink data or for transmitting uplink data corresponding to downlink control information, the downlink data and the downlink control information being received by the terminal apparatus, is a communication subframe that is located at or after a fourth subframe position from a downlink communication subframe in which the downlink data or the downlink control information is transmitted, and that is fixed to an uplink and positioned at earliest timing.

2. The base station apparatus according to claim 1, wherein:

the uplink communication subframe switchable to a downlink communication subframe is indicated by a combination of a UL-DL configuration indicated by a system information block (SIB), and a switchable subframe indication format which is another UL-DL configuration; and in the switchable subframe indication format, timing of the uplink communication subframe switchable to a downlink communication subframe is a subset of timing of an uplink communication subframe defined by the UL-DL configuration indicated by SIB.

3. The base station apparatus according to claim 1, wherein an uplink communication subframe for transmitting an error detection result for downlink data or for transmitting uplink data corresponding to downlink control information, the downlink data and the downlink control information being received by the terminal apparatus, is an uplink communication subframe that is located at or after a fourth subframe position from the downlink communication subframe in which the downlink data or the downlink control information is transmitted and that is located at or after a first subframe position from a special subframe at earliest timing.

4. A terminal apparatus comprising:

a receiving section that receives UL/DL communication subframe switching information indicating whether to perform uplink communication corresponding to assignment control information in one or more communication subframes fixed to an uplink and indicating whether to perform uplink communication or downlink communication in an uplink communication subframe switchable to a downlink communication subframe;

a mapping section that performs mapping according to the indication of the received UL/DL communication subframe switching information; and a transmitting section that transmits a mapped signal to a base station apparatus, wherein an uplink communication subframe for transmitting an error detection result for downlink data or for transmitting uplink data corresponding to downlink control information, the downlink data and the downlink control information being received by the terminal apparatus, is a communication subframe that is located at or after a fourth subframe position from a downlink communication subframe in which the downlink data or the downlink control information is transmitted, and that is fixed to an uplink and positioned at earliest timing.

5. The terminal apparatus according to claim 4, wherein, when the UL/DL communication subframe switching information is not received and when there is an uplink communication transmission period or transmission data in the uplink communication subframe switchable to a downlink communication subframe, transmission is performed in the uplink communication subframe switchable to a downlink communication subframe, and when there is no uplink communication transmission period or transmission data, reception is performed in the uplink communication subframe switchable to a downlink communication subframe.

6. A transmission method comprising:

controlling a base station apparatus to generate UL/DL communication subframe switching information indicating whether to perform uplink communication corresponding to assignment control information in one or more communication subframes fixed to an uplink and indicating whether to perform uplink communication or downlink communication in an uplink communication subframe switchable to a downlink communication subframe; and transmitting the generated UL/DL communication subframe switching information from the base station apparatus to a terminal apparatus, wherein an uplink communication subframe for transmitting an error detection result for downlink data or for transmitting uplink data corresponding to downlink control information, the downlink data and the downlink control information being received by the terminal apparatus, is a communication subframe that is located at or after a fourth subframe position from a downlink communication subframe in which the downlink data or the downlink control information is transmitted, and that is fixed to an uplink and positioned at earliest timing.

7. A reception method comprising:

receiving from a base station apparatus by a terminal apparatus, UL/DL communication subframe switching information indicating whether to perform uplink communication corresponding to assignment control information in one or more communication subframes fixed to an uplink and indicating whether to perform uplink communication or downlink communication in an uplink communication subframe switchable to a downlink communication subframe;

performing mapping of a transmission signal according to the indication of the received UL/DL communication subframe switching information; and transmitting the mapped transmission signal from the terminal apparatus to the base station apparatus, wherein an uplink communication subframe for transmitting an error detection result for downlink data or for transmitting uplink data corresponding to downlink control information, the downlink data and the downlink control information being received by the terminal apparatus, is a communication subframe that is located at or after a fourth subframe position from a downlink communication subframe in which the downlink data or the downlink control information is transmitted, and that is fixed to an uplink and positioned at earliest timing.

* * * * *